US011469702B2

(12) United States Patent
Wolf et al.

(10) Patent No.: US 11,469,702 B2
(45) Date of Patent: Oct. 11, 2022

(54) SYSTEMS AND METHODS FOR ADAPTIVE PULSE WIDTH MODULATION

(71) Applicant: Ford Global Technologies, LLC, Dearborn, MI (US)

(72) Inventors: Chris Wolf, Ann Arbor, MI (US); Michael Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/142,838

(22) Filed: Jan. 6, 2021

(65) Prior Publication Data
US 2022/0216818 A1 Jul. 7, 2022

(51) Int. Cl.
*H02P 1/04* (2006.01)
*H02P 27/08* (2006.01)
*B60L 15/20* (2006.01)
*B60L 50/61* (2019.01)
*B60L 15/08* (2006.01)

(52) U.S. Cl.
CPC ............ *H02P 27/085* (2013.01); *B60L 15/08* (2013.01); *B60L 15/20* (2013.01); *B60L 50/61* (2019.02); *B60L 2270/142* (2013.01)

(58) Field of Classification Search
CPC .... H02P 27/085; H02P 2209/09; H02P 27/08; H02P 29/50; H02P 6/28; H02P 6/10; H02P 27/06; H02P 8/12; G05B 11/28; B60L 50/61; B60L 15/08; B60L 15/20; B60L 2270/142
See application file for complete search history.

(56) References Cited

U.S. PATENT DOCUMENTS

| | | | |
|---|---|---|---|
| 8,649,923 B2 | 2/2014 | Sankaran et al. | |
| 9,479,095 B2 | 10/2016 | Sankaran | |
| 10,607,593 B1 | 3/2020 | Valeri et al. | |
| 10,632,909 B1 | 4/2020 | Wolf et al. | |

FOREIGN PATENT DOCUMENTS

| | | | | |
|---|---|---|---|---|
| CN | 108712076 A | * | 10/2018 | ......... H02M 3/1584 |
| JP | 2005208240 A | | 8/2005 | |
| KR | 20170088512 A | * | 8/2017 | |
| KR | 20200113138 A | * | 10/2020 | |
| WO | 2015087700 A1 | | 6/2015 | |

* cited by examiner

*Primary Examiner* — Karen Masih
(74) *Attorney, Agent, or Firm* — David Kelly; McCoy Russell LLP

(57) ABSTRACT

Methods and systems are provided for adaptive pulse width modulated control of an electrified powertrain of a vehicle. In one example, a method may include perturbing a switching frequency for pulse width modulated control of the electrified powertrain, and, responsive to sound measured in a vehicle cabin indicating a noise improvement after the perturbation, controlling the electrified powertrain with the perturbed switching frequency. In this way, acoustic emissions from an electrified powertrain may be reduced.

20 Claims, 11 Drawing Sheets

SYSTEMS AND METHODS FOR ADAPTIVE PULSE WIDTH MODULATION

FIELD

The present description relates generally to methods and systems for adapting pulse width modulation to reduce noise in a vehicle cabin.

BACKGROUND/SUMMARY

A vehicle, such as a hybrid electric vehicle or an all-electric vehicle, may include an electrified powertrain capable of supplying sufficient power to propel the vehicle independent of an internal combustion engine. Such an electrified powertrain may include an electric motor and a power source, such as a rechargeable battery or battery pack, configured to power the electric motor. The electric motor, powered by the power source, provides torque to one or more drive wheels of the vehicle via a driveshaft, thereby propelling the vehicle. A power circuit for the electrified powertrain may include an inverter for providing alternating current from the power supply, where the power circuit controls adjusting switches of the inverter to open and close in various combinations to provide desired voltages to the electric motor. In particular, the power circuit may use pulse width modulation (PWM) techniques to turn the switches on and off, where the rate or frequency at which the switches are turned on and off generally depends on motor speed or torque demand. Controlling the switches at certain switching frequencies may generate noise that is audible to the occupants of the vehicle.

Previous attempts to address such PWM acoustic emissions include using higher switching frequencies, which may be less audible to vehicle occupants, during vehicle operating conditions wherein PWM noise may be more pronounced. One example approach is shown by Sankaran et al. in U.S. Pat. No. 8,649,923. Therein, the inverter is controlled with either a default mode or a noise-reduction mode, wherein the default mode uses lower switching frequencies within the human audible range and the noise-reduction mode uses higher switching frequencies outside the human audible range.

However, the inventors herein have recognized potential issues with such systems. As one example, the use of the default mode depends on the presence of alternative noise sources that may mask the audible PWM acoustic emissions, while the higher switching frequencies of the noise-reduction mode induce power losses in the system that can reduce fuel economy of a hybrid vehicle and increase power circuit costs. Further, the calibration of such an approach is difficult as the masking nature of vehicle noise is inherently varying due to different driver behaviors, road surfaces, and ambient noise conditions, which may not be fully accounted for through design alone.

In one example, the issues described above may be addressed by a method for controlling an electrified powertrain of a vehicle with PWM, the method including modulating a PWM switching frequency with a perturbation, and controlling the electrified powertrain with the modulated PWM switching frequency responsive to sound measured in a cabin of the vehicle indicating a noise improvement responsive to the perturbation. In this way, a PWM scheme may be automatically updated based on in-cabin ambient acoustic conditions, resulting in reduced PWM acoustic emissions regardless of the PWM implementation strategy or operating mode.

As one example, the PWM scheme may select switching frequencies to achieve desired system efficiency or torque production accuracy. While controlling the electrified powertrain with the selected switching frequencies, one or more of the switching frequencies may be perturbed and the resulting impact of the perturbation on in-cabin acoustic conditions may be measured through an in-cabin microphone. If the perturbation results in improved acoustic conditions, the perturbed switching frequencies may be used to control the electrified powertrain. In this way, any PWM scheme may be adapted through relatively small perturbations that allow reductions in PWM acoustic emissions without sacrificing the desired outcome of the PWM control scheme.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
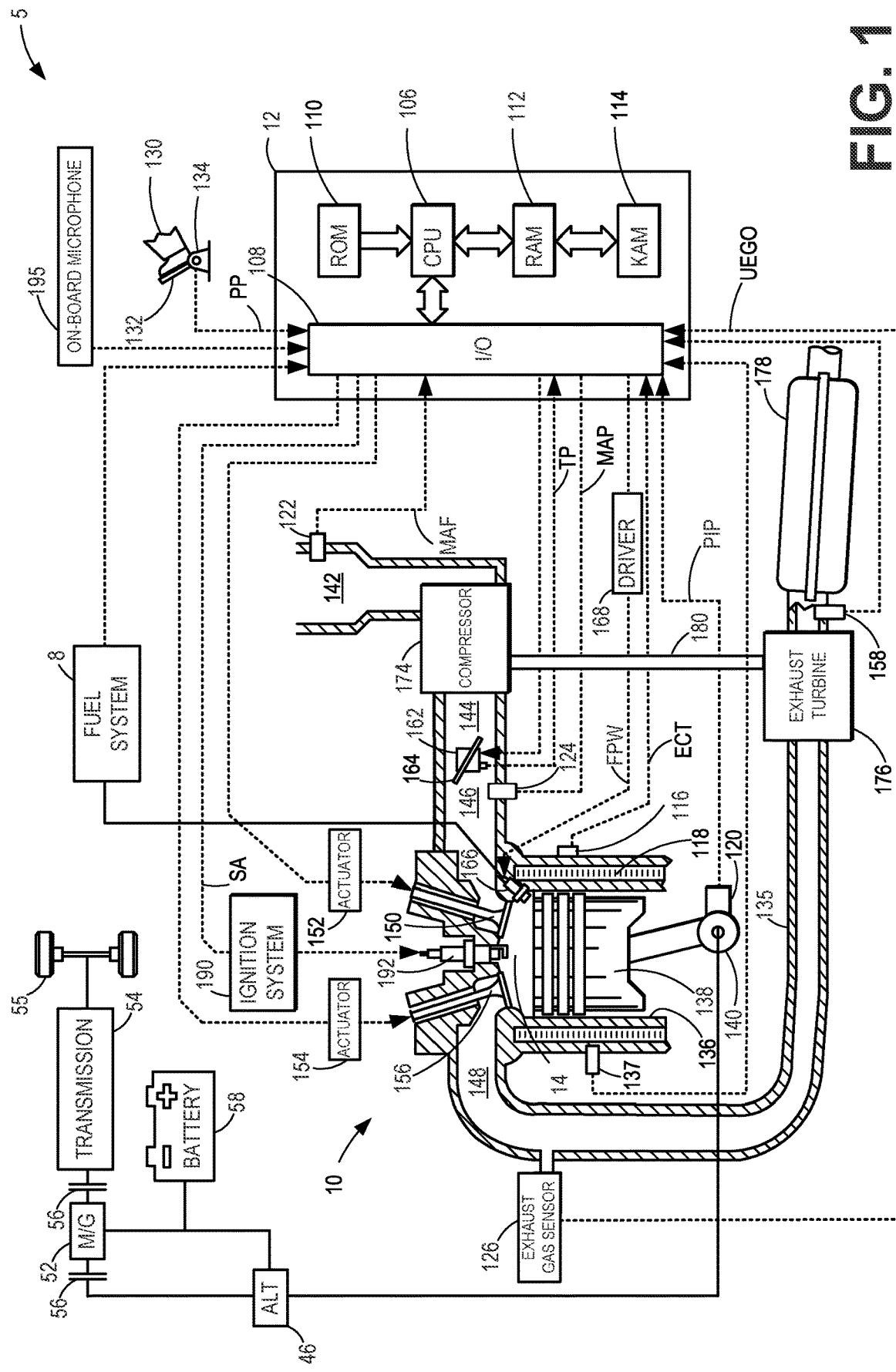
FIG. 1 shows a schematic depiction of an example vehicle system.
Figure 2:
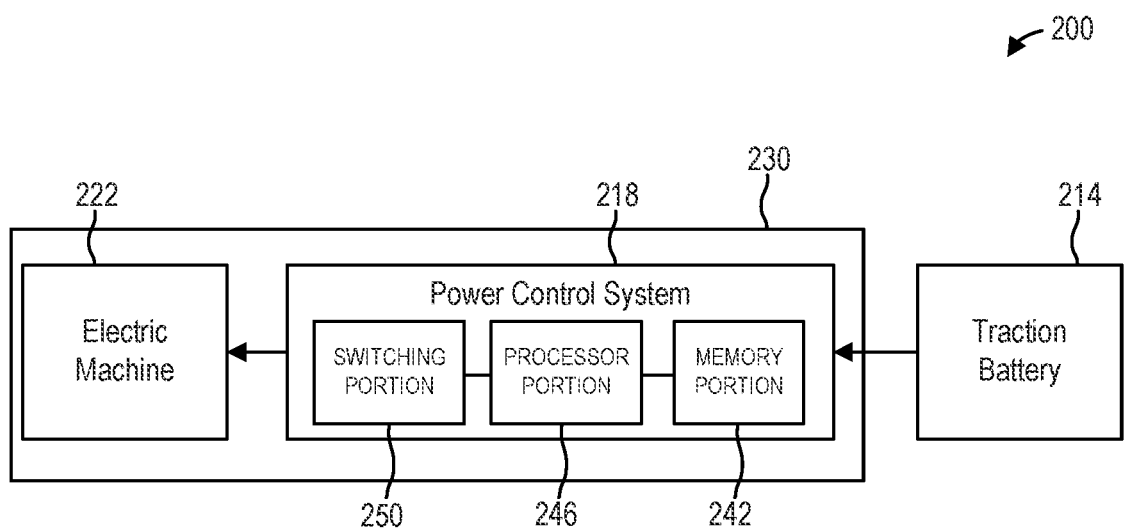
FIG. 2 shows a schematic diagram illustrating an example electrified powertrain of the example vehicle system of FIG. 1.
Figure 5:
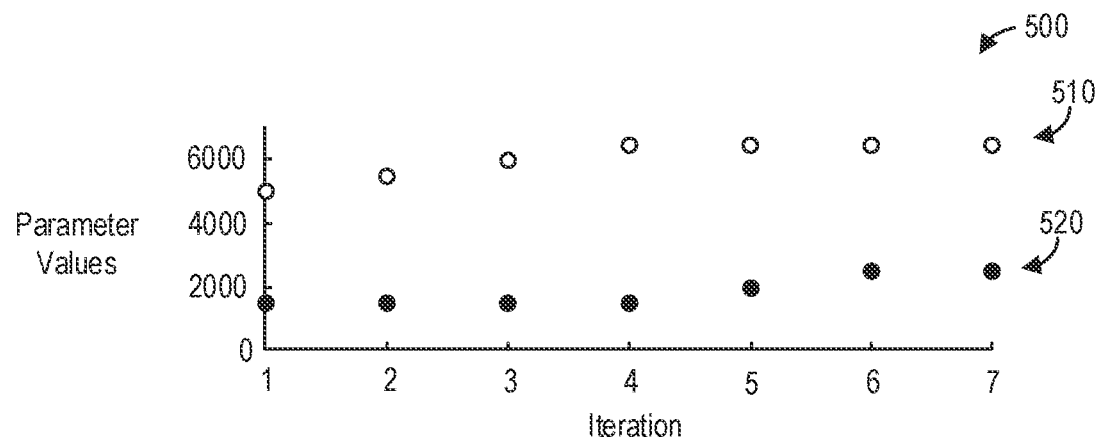
FIG. 5 shows a graph illustrating a first set of example parameter values over time obtained via the example method of FIG. 4.
Figure 6:
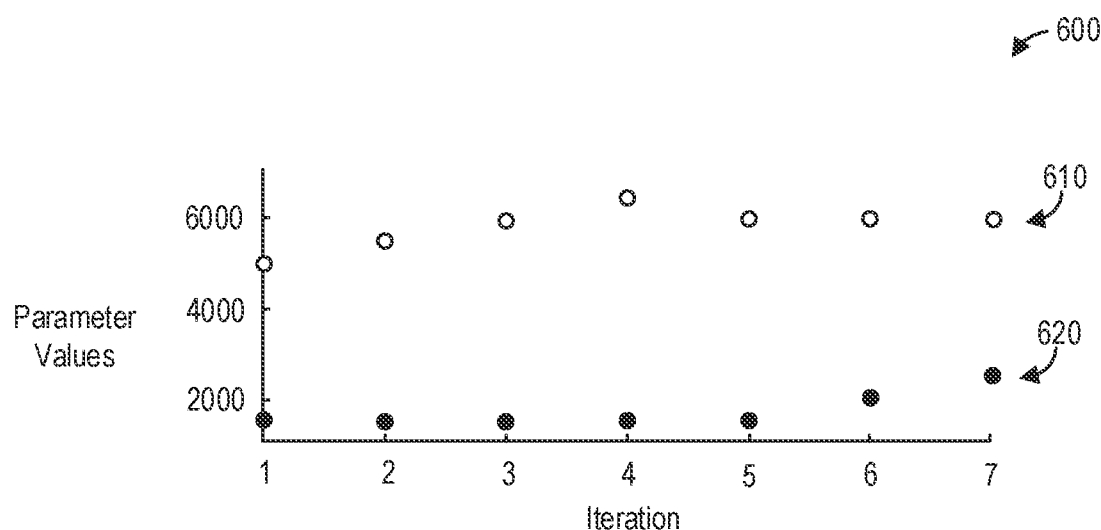
FIG. 6 shows a graph illustrating a second set of example parameter values over time obtained via the example method of FIG. 4.
Figure 10:
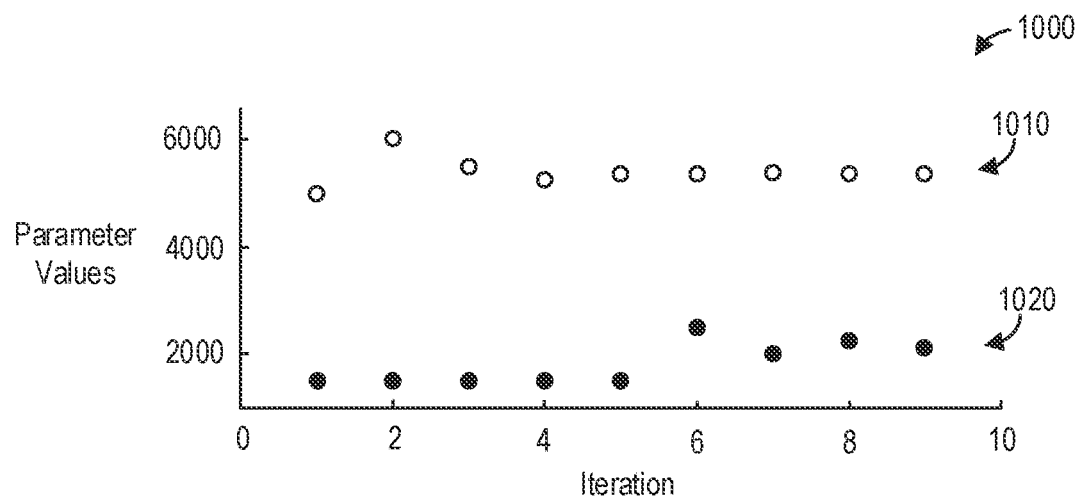
FIG. 10 shows a graph illustrating example parameter values over time obtained via the example method of FIG. 9.
Figure 11:
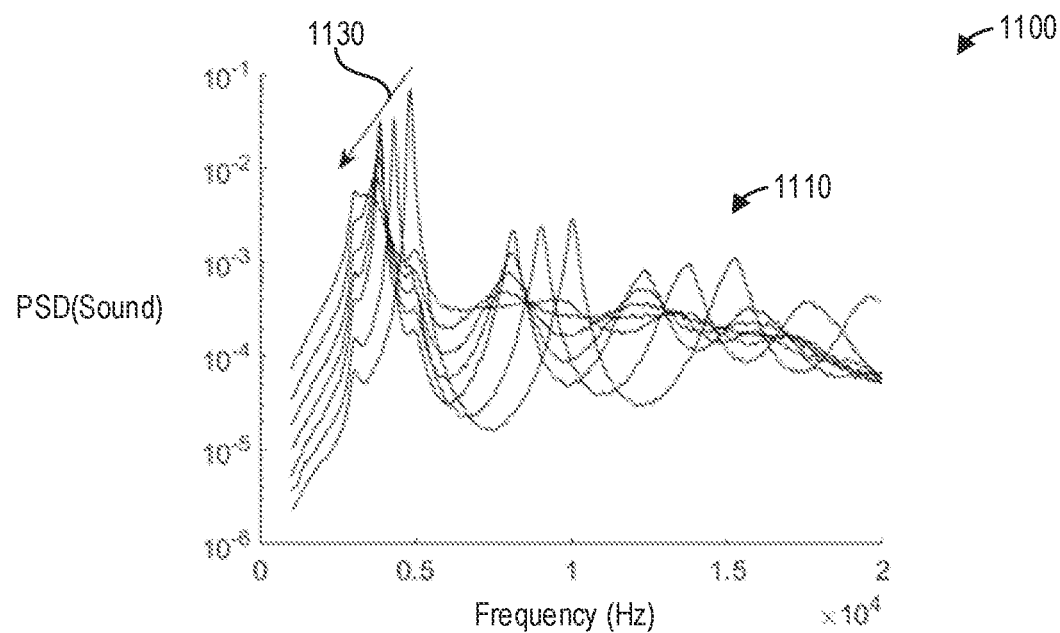
FIG. 11 shows a graph illustrating example power spectral densities during adaptation of pulse width modulation scheme parameters with two degrees of freedom.
Figure 12:
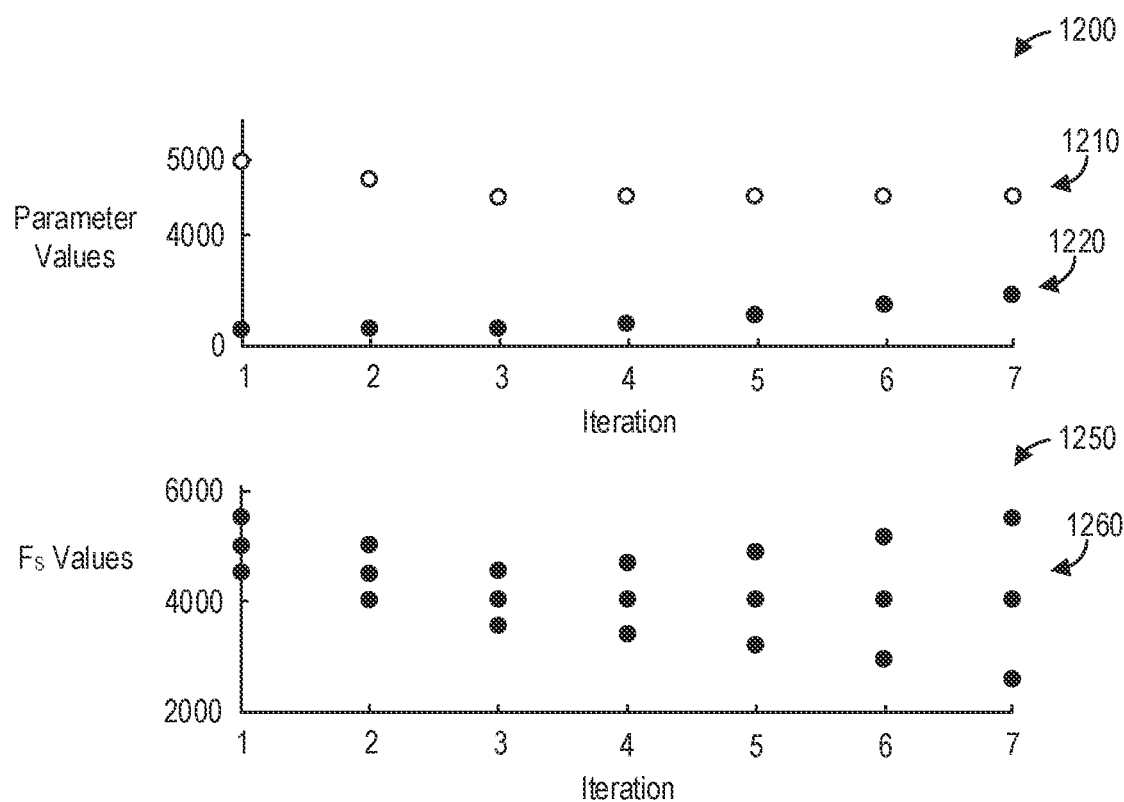
FIG. 12 shows graphs illustrating example parameter values and switching frequencies during adaptation of pulse width modulation scheme parameters with two degrees of freedom.
Figure 13:
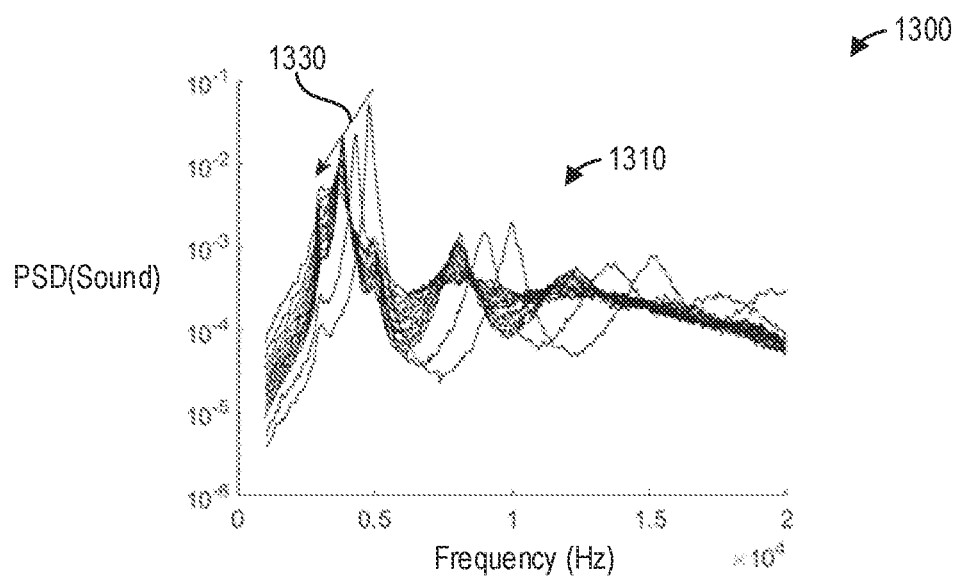
FIG. 13 shows a graph illustrating example power spectral densities during adaptation of pulse width modulation scheme parameters with three degrees of freedom.
Figure 14:
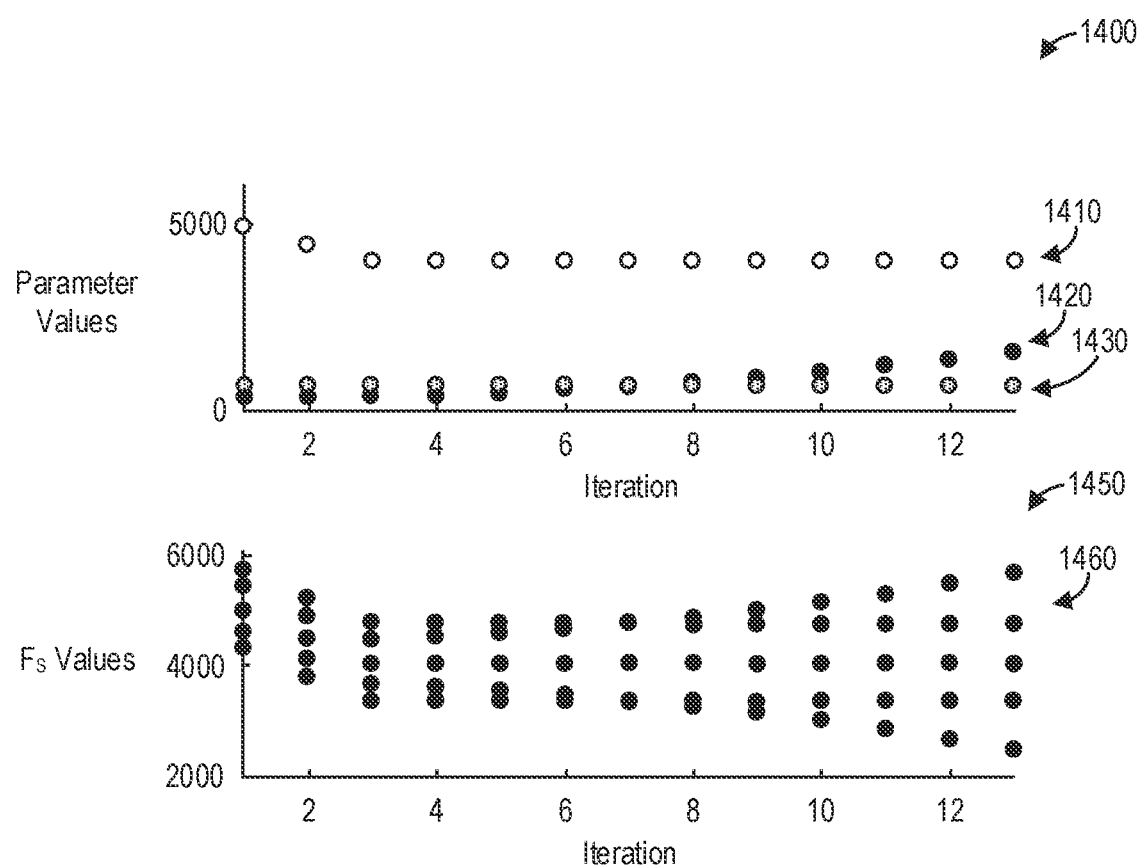
FIG. 14 shows graphs illustrating example parameter values and switching frequencies during adaptation of pulse width modulation scheme parameters with three degrees of freedom.

The following description relates to systems and methods for mitigating noise, vibrations, and harshness (NVH) resulting from pulse width modulation (PWM) control of a vehicle electric drive system, such as the electrified powertrain included in the vehicle system of FIG. 1. Pulse width modulation (PWM) is typically used to transfer power from a battery to an electric machine of an electrified vehicle powertrain, as shown in FIG. 2, wherein different PWM schemes may be implemented to control the opening and closing of electronic switches and thus regulate the transfer of power from the battery to the electric machine via the switches. Since the switching of the various switches on and off may generate audible noise at certain switching frequencies, the switching frequencies are selected to reduce sound emissions while addressing the needs for motor speed, torque requirements, and fuel efficiency. To further reduce such audible noise when PWM control is active, an adaptive method, such as the method shown in FIG. 3, includes altering or perturbing a parameter of the PWM scheme, measuring sound within the vehicle cabin, and evaluating the cabin sound to determine whether the perturbation improved the sound by reducing PWM acoustic emissions. By perturbing and adapting the PWM scheme in this way, separation of the PWM acoustic emissions from the rest of ambient cabin sound is unnecessary. A method for adapting a PWM scheme in response to specific conditions that trigger the update, such as the method shown in FIG. 4, includes repeatedly and sequentially perturbing parameters of the PWM scheme until such adjustments no longer yield acoustic improvements, as illustrated in FIGS. 5 and 6. A method for adapting a PWM scheme continuously while the PWM scheme is active, such as the method shown in FIG. 7, includes repeatedly and sequentially perturbing parameters of the PWM scheme until such adjustments no longer yield acoustic improvements, and then continuing to search for improvements even if they are unavailable, as illustrated in FIG. 8. Another method for adapting a PWM scheme, such as the method shown in FIG. 9, includes adjusting parameters of the PWM scheme with successively smaller perturbations, as illustrated in FIG. 10, which enables the adaptation of the parameters to converge to improved values. The adaptation of PWM scheme parameters as described herein results in corresponding adjustments to PWM switching frequencies and substantial improvements in noise quality when the PWM scheme is parameterized with two parameters, as shown in FIGS. 11 and 12, as well as three parameters, as shown in FIGS. 13 and 14.

Turning to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (here, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutch 56 is engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electric power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine 10, such as one or more auxiliary systems, including a heating, ventilation, and air conditioning (HVAC) system, vehicle lights, an on-board entertainment system, and other auxiliary systems based on their corresponding electrical demands. In one example, a current drawn on the alternator 46 may continually vary based on each of an operator cabin cooling demand, a battery charging requirement, other auxiliary vehicle system demands, and motor torque. A voltage regulator may be coupled to alternator 46 in order to regulate the power output of the alternator 46 based on system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from the engine 10, and exhaust turbine 176 may be optionally omitted. In still other examples, engine 10 may be provided with an electric supercharger (e.g., an "eBooster"), and compressor 174 may be driven by an electric motor.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, the compression ratio may be increased when different fuels are used. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed and engine load, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the fuel injector 166 may be located overhead and near the intake valve to increase mixing. Fuel may be delivered to fuel injector 166 from a fuel tank of fuel system 8 via a high-pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and may be further configured to inject this fuel mixture directly into cylinder 14. Further, fuel may be delivered to cylinder 14 during different strokes of a single cycle of the cylinder 14. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, and so on. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, and so on. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, and so on. Moreover, fuel characteristics of one or both fuel tanks may vary frequently, for example, due to day-to-day variations in tank refilling.

Engine 10 may further include one or more knock sensors coupled to each cylinder 14 for identifying abnormal cylinder combustion events, such as knock sensor 137 shown in FIG. 1. In other examples, one or more knock sensors may be coupled to selected locations of the engine block. In some examples, knock sensors 137 may be an accelerometer coupled to the cylinder block. In another example, knock sensor 137 may be an ionization sensor configured in the spark plug of each cylinder. The output of knock sensor 137 may be used to indicate an abnormal combustion event in cylinder 14 and the rest of the cylinders included in engine 10. In one example, based on the output of knock sensor 137 in one or more defined windows (e.g., crank angle timing windows), abnormal combustion due to one or more of knock and pre-ignition may be identified and differentiated. For example, knock may be identified responsive to knock sensor output obtained in a knock window being higher than a knock threshold, while pre-ignition may be identified responsive to knock sensor output obtained in a pre-ignition window being higher than a pre-ignition threshold. The pre-ignition threshold may be higher than the knock threshold, and the pre-ignition window may be earlier than the knock window, for example. In some examples, the knock sensor output may be combined with the output of a crankshaft acceleration sensor to identify one or more of knock and pre-ignition.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; a throttle position signal (TP) from a throttle position sensor; signal UEGO from exhaust gas sensor 126, which may be used by controller 12 to determine the AFR of the exhaust gas; a knock signal from knock sensor 137; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Furthermore, controller 12 may receive signals from an on-board microphone 195 coupled within vehicle 5. For example, on-board microphone 195 may be used to determine a sound level and/or frequency of various sounds in and around vehicle 5, including ambient sounds, voice commands, engine sounds, and so on. In some examples, on-board microphone 195 may be located in a passenger cabin of vehicle 5, such as on a dashboard of the vehicle, and may be used for inputting voice commands from the vehicle operator, hands-free telephone conversations, and so on. In other examples, on-board microphone 195 may be located externally, such as mounted on an exterior surface of vehicle 5 (e.g., on a windshield or hood) and may be used for navigation and obstacle avoidance based on ambient sounds from an environment of vehicle 5. In still other examples, on-board microphone 195 may be mounted in an under-hood compartment of vehicle 5. In each example, on-board microphone 195 transmits an output signal corresponding to sound pressure fluctuations from the various sources (e.g., the vehicle operator, the engine, and the vehicle environment). Controller 12 may distinguish noises from the various sources based on the frequency of the output, as further described below.

Controller 12 receives signals from the various sensors of FIG. 1, processes the received signals, and employs the various actuators of FIG. 1 (e.g., fuel injector 166 and spark plug 192) to adjust engine operation based on the received signals and instructions stored on a memory of the controller 12. For example, the controller 12 may receive a pedal position signal PP from the pedal position sensor 134, process the pedal position signal PP to determine a torque demand, and control the electric machine 52 to provide torque to vehicle wheels 55 according to the torque demand. To control the electric machine 52 as desired, the controller 12 may control one or more electronic switches of an inverter (not shown) to turn on and/or off in order to selectively regulate the delivery of power from the battery 58, for example, to the electric machine 52. As discussed further herein, while controlling the electric machine 52 to provide torque to the vehicle wheels 55, the controller 12 may further receive sound measurements of in-cabin ambient sound from on-board microphone 195, transform and process the sound measurements to evaluate the in-cabin ambient sound, and adjust operation of the electronic switches based on the evaluation of the in-cabin ambient sound. For example, as described further below, the controller 12 may perturb one or more parameters for controlling the operation of the electronic switches, adjust control of the electronic switches according to the perturbation, receive sound measurements of in-cabin ambient sound after adjusting the control of the electronic switches, transform and process the received sound measurements to evaluate whether the perturbation(s) improved the in-cabin ambient sound, and further control the electronic switches according to the evaluation of the perturbation(s).

As described above, FIG. 1 shows only one cylinder of a multi-cylinder engine. As such, each cylinder may similarly include its own set of intake/exhaust valves, fuel injector(s), spark plug, and so on. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Next, FIG. 2 shows an example system 200 for an electrified vehicle powertrain 230. The system 200 includes a traction battery 214, which may comprise the battery 58 of the vehicle 5, to power the electrified vehicle powertrain 230. The electrified vehicle powertrain 230 comprises an electric machine 222, which may comprise the electric machine 52 of the vehicle 5, for example. The electrified vehicle powertrain 230 further comprises a power control system 218, which may comprise the controller 12 in some examples or a standalone controller in other examples, for controlling the electric machine 222. The electric machine 222 and the power control system 218 provide the electrified vehicle powertrain 230. When the electrified vehicle powertrain 230 is operating, the electrified vehicle powertrain 230 can emit sounds, including audible sounds, inaudible sounds, or both. A user in a passenger compartment of an electrified vehicle, such as the vehicle 5 configured with the electrified vehicle powertrain 230, or a user proximate the electrified vehicle outside the passenger compartment, can perceive the sounds. The user can hear the audible sounds, and perceive the inaudible sounds as vibrations.

The electric machine 222 can generate the sounds during operation. The power control system 218 can instead, or additionally, generate the sounds during operation. Altering characteristics of power delivered within the electrified vehicle powertrain 230 can change the sounds. To alter characteristics of the power, the power control system 218 can pulse width modulate (PWM) power sent from the traction battery 214 to the electric machine 222. Pulse width modulation can control and shape the flow of electrical power to and from various components of the electrified vehicle powertrain 230. Pulse width modulation can change the sounds without having a significant negative impact on the controllability, efficiency, and torque production accuracy of the electrified vehicle powertrain 230.

The power control system 218 includes a memory portion 242, a processor portion 246, and a switching portion 250. The power control system 218 may comprise a standalone controller, or may be incorporated into a controller system of the vehicle 5 such as the controller 12. The memory portion 242 may comprise one or more volatile and/or non-volatile memory elements, and in some examples may comprise one or more of the ROM 110, the RAM 122, and the KAM 114 of the controller 12. The processor portion 246 may comprise the CPU 106 of the controller 12, for example, or may comprise a separate CPU, an auxiliary processor, or another suitable device for executing software or firmware-based instructions. The switching portion 250 may include one or more switches that are opened and closed in various combinations to provide desired inverter output voltages to the electric machine 222, and in this way the switching portion 250 functions as an inverter for transferring power from the traction battery 214 to the electric machine 222. The switches of the switching portion 250 may comprise semiconductor switches, such as insulated-gate bipolar transistors (IGBTs), as an illustrative and non-limiting example.

A program executed by the processor portion 246 may be stored as executable instructions in the memory portion 242, for example. The program may include one or more additional or separate programs, each of which includes an ordered list of executable instructions for implementing logical functions associated with the power control system 218. The logical function may include controlling the switching portion 250 according to a table stored within the memory portion 242, for example.

In particular, pulse width modulation (PWM) techniques are used to control the switches, and the processor portion 246 may command the switching portion 250 to open and close as desired. The switching frequency for each switch of the switching portion 250, or the rate at which each switch is turned on and off, is typically determined by motor speed or torque requirements as well as fuel efficiency considerations. Since the switching of the various switches on and off may generate audible noise at certain switching frequencies, the switching frequencies are selected to reduce sound emissions while addressing the needs for motor speed, torque requirements, and fuel efficiency. The particular PWM scheme or PWM operating mode used to control the switching portion 250 may depend on various operating conditions of the vehicle. As illustrative and non-limiting examples, the PWM scheme or mode may include one or more PWM implementation strategies such as continuous PWM, discontinuous PWM, random PWM, fixed frequency PWM, and so on. Further, different PWM modes may comprise a noise-reduction mode configured for performing PWM with reduced noise as well as a fuel-efficiency mode configured for maximizing fuel efficiency. As an example, for a noise-reduction mode, high switching frequencies may be used with random PWM or another PWM strategy during periods of increasing or decreasing vehicle speed wherein switching noise may be more pronounced, as the high frequencies may be inaudible to humans. In contrast, for a fuel-efficiency mode, low switching frequencies may be used with a PWM strategy to reduce power losses that may in turn impact fuel efficiency, for example, despite the potential audibility of such low switching frequencies. Further, dithering may be used in conjunction with any PWM mode for controlling the switches. In general, during vehicle operation, the power control system 218 selects a PWM scheme for controlling the switching portion 250 based on operating conditions of the vehicle, such as vehicle speed, torque demand, and so on, wherein the PWM scheme comprises a PWM implementation strategy (e.g., random PWM, continuous PWM, and so on), a PWM mode (e.g., noise-reduction mode, fuel-efficiency mode, and so on), and other factors (e.g., dithering).

Furthermore, even in noise-reduction modes wherein switching frequencies are selected to reduce emissions of sound, the various considerations in a PWM scheme may result in PWM acoustic emissions that are audible within the vehicle cabin. A controller, such as the controller 12 or the power control system 218, may execute a PWM scheme update method that runs autonomously from the PWM scheme control, wherein the controller selectively perturbs parameters of the PWM scheme to reduce PWM acoustic emissions regardless of the PWM implementation strategy or the PWM mode.

The potential switching frequencies for a PWM scheme may be expressed parametrically, and the methods described herein may therefore alter a parameter corresponding to the parametrization of the PWM scheme. The particular parameters of a PWM scheme parametrization depends on the particular PWM scheme as well as the desired number of degrees of freedom. For example, the PWM scheme may comprise random PWM, continuous PWM, discontinuous PWM, fixed frequency PWM, and so on, and the potential switching frequencies may be parametrized with a number of degrees of freedom such as two degrees of freedom or three degrees of freedom. As an example, for two degrees of freedom, a parameterized pool of three potential switching frequencies may be expressed as:

$$F_{s|F_\mu, F_\Delta} = F_\mu + [-1 \ 0 \ 1] \cdot F_\Delta,$$

where the switching frequencies $F_s$ are parametrized in terms of a first parameter $F_\mu$ and a second parameter $F_\Delta$. For this parameterization, the first parameter $F_\mu$ establishes a mean switching frequency, while the second parameter establishes a distance or delta of the two frequencies from the mean switching frequency. The same pool of three potential switching frequencies may be alternatively parametrized with three degrees of freedom and expressed as:

$$F_s|_{F_\mu, F_{\Delta_1}, F_{\Delta_2}} = F_\mu + [F_{\Delta_1} \ 0 \ F_{\Delta_2}],$$

where the switching frequencies $F_s$ are parametrized in terms of a first parameter $F_\mu$, a second parameter $F_{\Delta_1}$, and a third parameter $F_{\Delta_2}$. By parameterizing the delta frequency parameter as two parameters, the distance of the two switching frequencies other than the mean switching frequencies may be independently controlled. Further, boundaries are provided for each parameter or degree of freedom to define a viable parameter space, and such boundaries may be determined for each parameter based on operating points in order to ensure that the PWM scheme operates within the viable parameter space and provides efficiency and stability relative to the operating points. While more than two or three degrees of freedom are possible in the parametrization of the switching frequency, it should be appreciated that fewer degrees of freedom are preferable while still retaining the ability to have an impact on the acoustic emissions of the PWM scheme.

Figure 3:
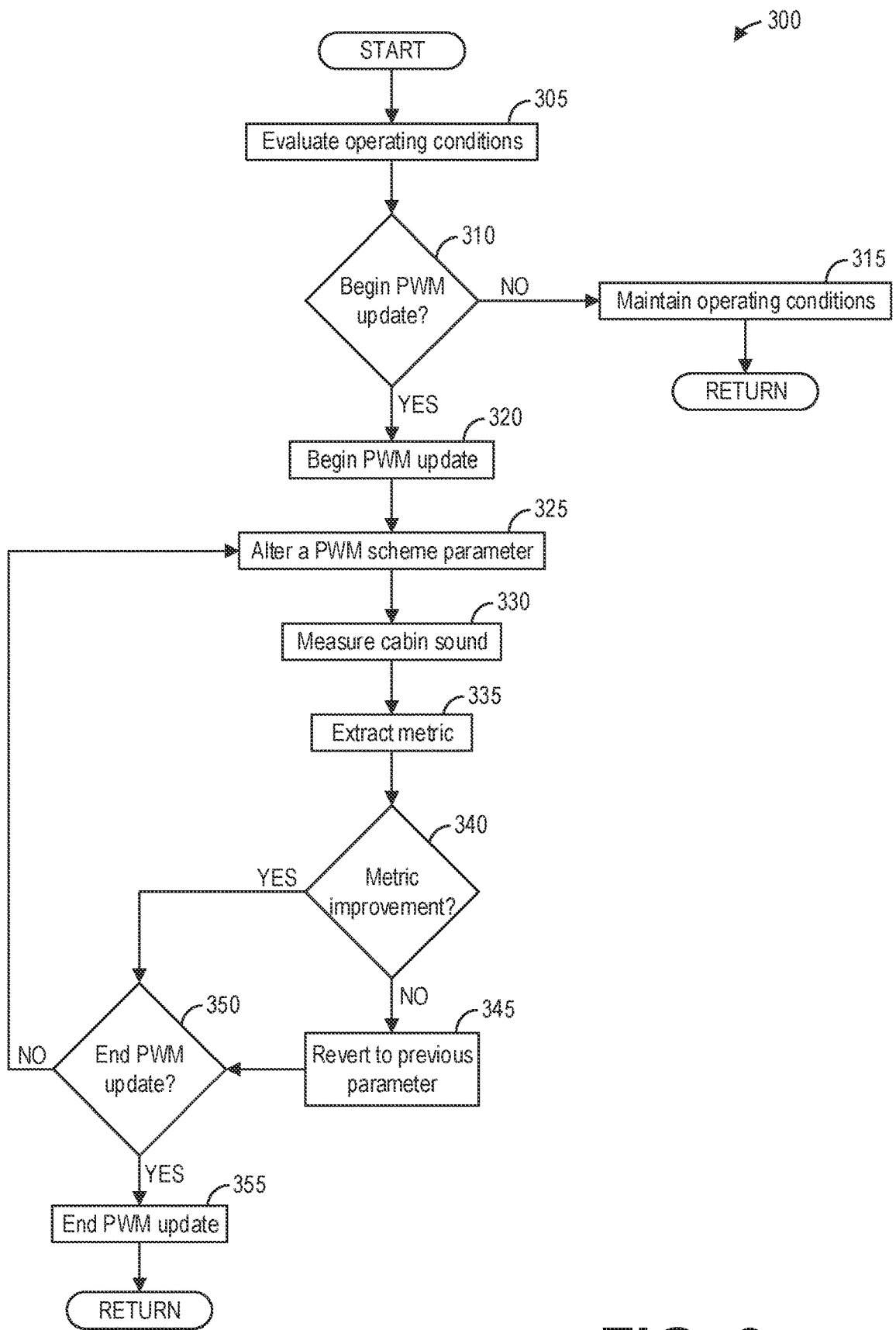
FIG. 3 shows a high-level flow chart illustrating an example method for adapting pulse width modulation to reduce acoustic emissions.

FIG. 3 shows a high-level flow chart illustrating an example method 300 for adapting pulse width modulation to reduce NVH according to an embodiment. Instructions for carrying out method 300 and the rest of the methods included herein may be executed by a controller based on instructions stored on a memory of the controller and in conjunction with signals received from sensors of the vehicle system, such as the sensors described above with reference to FIG. 1. For example, method 300 may be implemented as executable instructions stored in non-transitory memory 110 of the controller 12, for example, that when executed by processor 106 of the controller 12 cause the controller 12 to perform the actions described herein. As another example, method 300 may be implemented as executable instructions in non-transitory memory 242 of the power characteristic control system 218 that when executed by the processor portion 246 cause the power control system 218 to perform the actions described herein.

Method 300 begins at 305. At 305, method 300 evaluates operating conditions. The operating conditions may include, as an illustrative and non-limiting example, whether PWM is active. Additional operating conditions may include, as illustrative and non-limiting examples, one or more of torque or speed demand, in-cabin ambient sound, and a status of in-vehicle multimedia unit. Operating conditions such as torque or speed demand may be evaluated based on pedal position, for example, while operating conditions such as the in-cabin ambient sound may be evaluated based on signals from an in-cabin microphone. For example, the in-cabin ambient sound evaluated based on signals from the in-cabin microphone may indicate sound levels within the vehicle cabin. In particular, the operating conditions may include a noise quality metric measured from the in-cabin ambient sound, including but not limited to maximum spectral power, spectral power variance, average spectral power, and so on as discussed further herein. In addition, in some examples, the status of an in-vehicle multimedia unit may indicate whether and how the in-vehicle multimedia unit is being used (e.g., whether a radio is on, whether a phone call is in progress, whether navigation instructions are being output, and so on), and such status may indicate in-cabin sounds.

At 310, method 300 determines whether to begin a PWM update. In some examples, method 300 may perform a PWM update continuously whenever PWM is active. In other examples, method 300 may perform a PWM update responsive to specific operating conditions that trigger the adaptation. For example, method 300 may determine to begin a PWM update responsive to changes in a vehicle operating point, such as changes to speed or torque demand, or responsive to changes to the in-vehicle or cabin acoustic environment (e.g., when a radio is turned off, a phone call is ended, a conversation between vehicle occupants begins or ends, road surface sounds audibly change within the vehicle due to change in road surfaces, and so on) as evaluated based on an in-cabin microphone and/or a status of an in-vehicle multimedia unit. If method 300 determines to not begin a PWM update ("NO"), method 300 continues to 315, where method 300 maintains operating conditions and the PWM is not updated. Method 300 then returns.

However, if method 300 decides at 310 to begin a PWM update ("YES"), method 300 continues to 320. At 320, method 300 begins a PWM update. At 325, method 300 alters a PWM scheme parameter. The potential switching frequencies for a PWM scheme may be expressed parametrically as discussed hereinabove, and method 300 may thus alter a parameter corresponding to the parametrization of the PWM scheme. For example, method 300 may increase or decrease a parameter of the PWM scheme by a predetermined amount.

After perturbing the parameter at 325, method 300 continues to 330. At 330, method 300 measures cabin sound, for example via an in-cabin microphone. As the raw sampled cabin sound may not be sufficient to measure changes in the acoustic PWM emissions, method 300 may therefore perform digital signal processing to extract a measure characterizing the cabin sound. To that end, continuing at 335, method 300 extracts a metric from the measured cabin sound. For example, method 300 may apply a fast Fourier transform (FFT) to the measured cabin sound and estimate the power spectral density (PSD) using Welch's method on the transformed cabin sound. The metric may thus comprise the PSD of the measured cabin sound, in some examples, which comprises a measure of the signal power contained in different frequency bands. Additionally or alternatively, the metric may comprise one or more measures extracted from the PSD, including but not limited to maximum spectral power, spectral power variance across multiple frequency bands, average spectral power across multiple frequency bands, and so on. Other harmonic analysis methods may be used, including but not limited to using the Goertzel algorithm to form dynamic measures of the amplitude at single frequency points, performing a discrete wavelet transform to track PWM-like features in the acoustic data, and so on.

At 340, method 300 determines whether there is a metric improvement. For example, method 300 may compare the metric measured or extracted at 335 after perturbing the PWM scheme parameter at 325 to the same metric measured or extracted at 305 when evaluating the operating conditions. Method 300 may determine that there is a metric improvement if the measured metric after the perturbation indicates that the metric is reduced relative to the measurement before the perturbation, and conversely method 300 may determine that there is no metric improvement if the measured metric after the perturbation is increased relative to the measured metric before the perturbation.

If there is no improvement ("NO"), method 300 continues to 345 and reverts the altered PWM scheme parameter to the previous parameter value. That is, method 300 removes the perturbation to the PWM scheme parameter applied at 325. Method 300 then continues to 350. Referring again to 340, if method 300 determines a metric improvement ("YES"), method 300 proceeds from 340 to 350 without reverting the altered PWM scheme parameter.

At 350, method 300 determines whether to end the PWM update. In one example, method 300 determines to end the PWM update after a predetermined number of iterations of perturbing the PWM scheme parameter(s). For example, method 300 may alter each PWM scheme parameter at least once during an iteration, and method 300 may perform at least one iteration of PWM scheme parameter alterations. In another example, method 300 determines to end the PWM update when the PWM scheme ends. For example, if the PWM update begins responsive to the PWM scheme beginning, method 300 may continuously adapt the PWM scheme parameters while the PWM scheme is running and end the adaptation when the PWM scheme ends. As another example, method 300 determines to end the PWM update when perturbations of the PWM scheme parameter(s) no longer yield any improvement in the PWM acoustic emissions as determined at 340.

Thus, if method 300 determines to not end the PWM update ("NO"), method 300 returns to 325 to alter a PWM scheme parameter. Method 300 may alter the same PWM scheme parameter altered in the previous iteration, or may alter another PWM scheme parameter. Method 300 may thus repeatedly update one or more PWM scheme parameters, measure cabin sound, and evaluate a metric to determine metric improvements until method 300 determines at 350 to end the PWM update. When method 300 determines to end the PWM update ("YES") at 350, method 300 continues from 350 to 355 to end the PWM update. Method 300 then returns.

Figure 4:
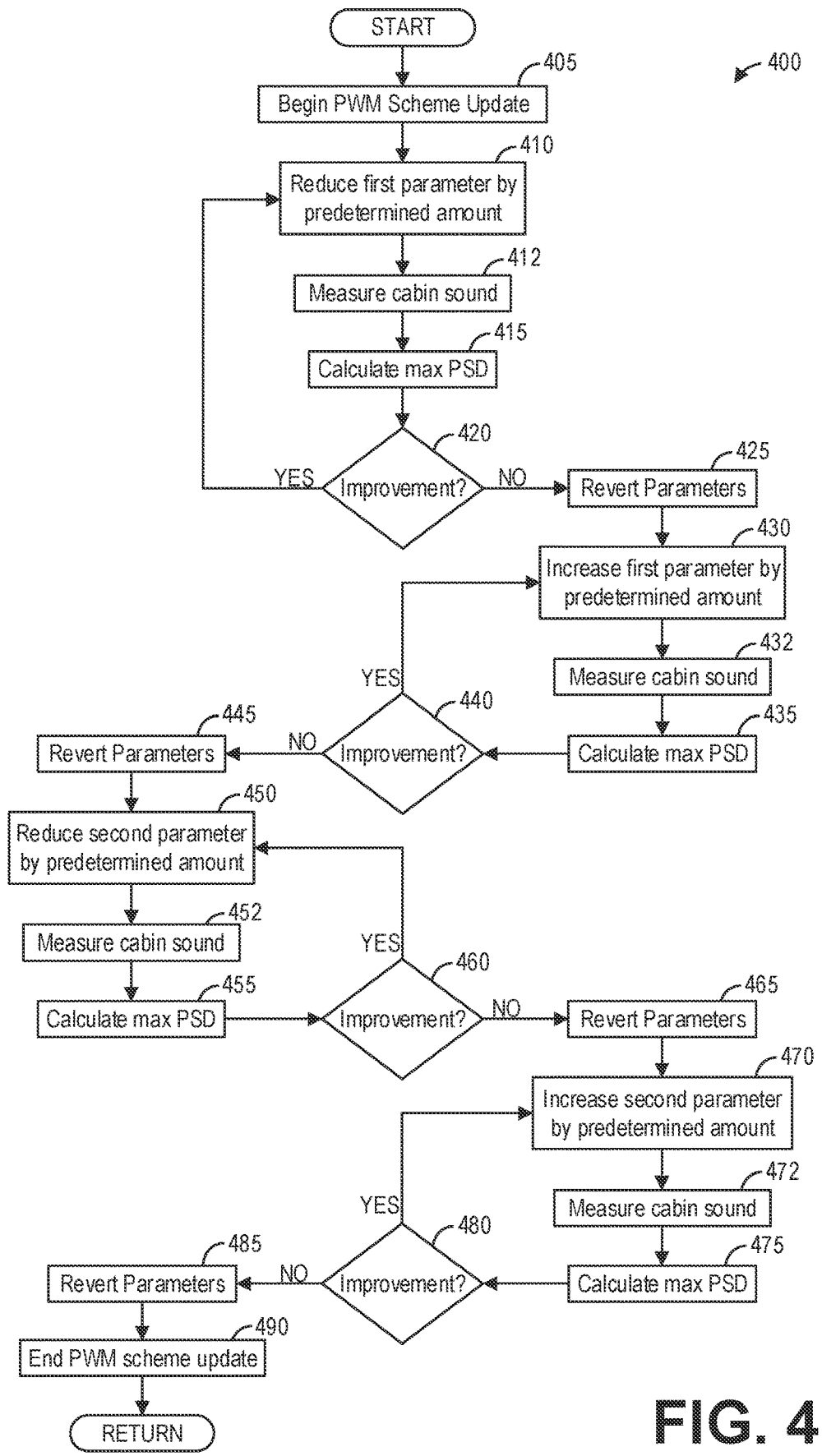
FIG. 4 shows a high-level flow chart illustrating an example method for adapting pulse width modulation with two degrees of freedom responsive to the adaptation being triggered.

FIG. 4 shows a high-level flow chart illustrating an example method 400 for adapting pulse width modulation with two degrees of freedom, such as a first parameter and a second parameter of a PWM scheme parameterized with two such parameters, wherein the quality measure for evaluating the cabin sound comprises a maximum power spectral density. Method 400 may be implemented as executable instructions stored in non-transitory memory 110 of the controller 12 that when executed by processor 106 of the controller 12 cause the controller 12 to perform the actions described herein.

Method 400 begins at 405. At 405, method 400 begins a PWM scheme update. Method 400 begins a PWM scheme update at 405 responsive to determining to begin a PWM update, such as described hereinabove with regard to FIG. 3. For example, method 400 may perform a PWM scheme update continuously whenever the PWM scheme is active, and so method 400 may begin the PWM scheme update responsive to the PWM scheme activating or beginning. In other examples, method 400 may perform the PWM scheme update responsive to specific operating conditions that trigger the adaptation, including but not limited to changes in a vehicle operating point, such as changes to speed or torque demand, or changes to the in-vehicle or cabin acoustic environment (e.g., when a radio is turned off, a phone call is ended, a conversation between vehicle occupants begins or ends, road surface sounds audibly change within the vehicle due to change in road surfaces, and so on) as evaluated based on an in-cabin microphone and/or a status of an in-vehicle multimedia unit.

At 410, method 400 reduces a first parameter by a predetermined amount. The first parameter comprises a parameter of the parameterized PWM scheme. For example, as discussed hereinabove, the PWM scheme may be parameterized by a first parameter $F_\mu$ and a second parameter $F_A$. Method 400 may therefore reduce the first parameter $F_\mu$ by the predetermined amount. The predetermined amount may comprise a percentage of the first parameter and therefore the predetermined amount may depend on the current value of the first parameter. As an illustrative example, the predetermined amount may comprise 10% of the first parameter, though it should be appreciated that the predetermined amount may comprise a percentage greater than 10% or less than 10% in some examples. Method 400 may therefore reduce the first parameter $F_\mu$ by 10% for a subsequent iteration of the PWM scheme. In other examples, the predetermined amount may comprise an amount that is independent of the current value of the first parameter. In all examples, method 400 perturbs the first parameter by the predetermined amount.

After reducing or perturbing the first parameter by the predetermined amount, method 400 evaluates the in-vehicle sound to determine whether the perturbation improved the PWM acoustic emissions. To that end, at 412, method 400 measures cabin sound, for example via an in-cabin microphone. As PWM frequency content overlaps human speech frequencies, method 400 may measure the cabin sound via an in-cabin microphone configured for voice commands and hands-free calling, rather than a microphone adapted for measuring low frequencies for use in active noise cancellation. After measuring cabin sound, method 400 continues to 415. At 415, method 400 calculates a maximum PSD, also referred to herein as the max PSD, of the measured cabin sound. To calculate the maximum PSD, method 400 may apply an FFT to the measured cabin sound and estimate the PSD using Welch's method on the transformed cabin sound. It should be appreciated that calculation of the maximum PSD is illustrative and non-limiting, and that other noise quality metrics may be calculated or otherwise derived from the measured cabin sound in some examples.

Continuing at 420, method 400 determines whether there is an improvement in the cabin sound resulting from the perturbation of the PWM scheme parameter at 410. For example, method 400 may compare the maximum PSD calculated at 415 after perturbing the PWM scheme parameter at 410 to the same measure calculated from cabin sound measured prior to the perturbation. Method 400 may determine that there is an improvement if the maximum PSD after the perturbation indicates that the maximum PSD is reduced relative to a measurement of the maximum PSD before the perturbation, and conversely method 400 may determine that there is no improvement if the maximum PSD after the perturbation is increased relative to the measurement before the perturbation.

If there is an improvement ("YES"), method 400 returns to 410 and reduces the first parameter again by the predetermined amount. For example, method 400 may reduce the first parameter again by 10% of the most recent value of the first parameter. At 412, method 400 measures the cabin sound resulting from the reduced first parameter, calculates the maximum PSD at 415, and then determines whether there is an improvement at 420. Method 400 thus continues to reduce the first parameter by the predetermined amount until there is no improvement at 420 ("NO"). Method 400 then proceeds to 425. At 425, method 400 reverts the first parameter to the value of the first parameter in the previous iteration.

Continuing at 430, method 400 increases the first parameter by a predetermined amount. The predetermined amount may comprise the same predetermined amount at 410, such as 10% of the value of the first parameter. After perturbing the first parameter by the predetermined amount, method 400 continues to 432. At 432, method 400 measures the cabin sound, for example via the in-cabin microphone, and then at 435, method 400 calculate the max PSD of the measured cabin sound.

At 440, method 400 determines whether there is an improvement in the cabin sound resulting from the perturbation of the first parameter at 430. Similar to the determination at 420, method 400 may determine that there is an improvement ("YES") if the max PSD is reduced relative to a most recent measurement of the max PSD, and may determine that there is no improvement ("NO") if the max PSD is increased relative to the most recent measurement of the max PSD.

If there is an improvement ("YES"), method 400 returns to 430 and increases the first parameter again by the predetermined amount. At 432, method 400 measures the cabin sound resulting from the increased first parameter, calculates the max PSD at 435, and then determines whether there is an improvement at 440. Method 400 thus continues to increase the first parameter by the predetermined amount until there is no improvement at 440 ("NO"). Method 400 then proceeds to 445. At 445, method 400 reverts the first parameter to the value of the first parameter in the previous iteration.

Continuing at 450, method 400 reduces a second parameter of the PWM scheme by a predetermined amount. For example, method 400 may reduce the second parameter $F_A$ of the PWM scheme when parameterized with two degrees of freedom as discussed hereinabove. Similar to the predetermined amount at 410 and 430, the predetermined amount at 450 may comprise a percentage of the second parameter and therefore the predetermined amount may depend on the current value of the second parameter. As an illustrative example, the predetermined amount may comprise 10% of the second parameter, though it should be appreciated that the predetermined amount may comprise a percentage greater than 10% or less than 10% in some examples. Method 400 may therefore reduce the second parameter $F_A$ by 10% for a subsequent iteration of the PWM scheme. In other examples, the predetermined amount may comprise an amount that is independent of the current value of the second parameter. In all examples, method 400 perturbs the second parameter by the predetermined amount. Further, while the predetermined amounts at 410, 430, and 450 may comprise a similar predetermined amount (e.g., a same percentage of the current value of the parameter being perturbed), the predetermined amounts for the first parameter and the second parameter may be different in some examples, depending on how the PWM scheme is parameterized. For example, if a parameter is more or less sensitive to perturbations relative to another parameter, the percentage of the parameter for the perturbing the parameter may be lesser or greater than the percentage of the other parameter for perturbing the other parameter.

After perturbing the second parameter at 450, method 400 continues to 452. At 452, method 400 measures the cabin sound, for example via the in-cabin microphone. At 455, method 400 calculates the maximum PSD of the measured cabin sound obtained at 452.

At 460, method 400 determines whether there is an improvement in the cabin sound resulting from the perturbation to the second parameter as indicated by the maximum PSD. If there is an improvement ("YES"), method 400 returns to 450 and reduces the second parameter again by the predetermined amount. At 452, method 400 measures the cabin sound resulting from the reduced second parameter, calculates the max PSD at 455, and then determines whether there is an improvement at 460. Method 400 thus continues to reduce the second parameter by the predetermined amount until there is no improvement at 460 ("NO"). Method 400 then proceeds to 465. At 465, method 400 reverts the second parameter to the value of the second parameter in the previous iteration.

Continuing at 470, method 400 increases the second parameter by the predetermined amount. At 472, method 400 measures the cabin sound, and at 475, method 400 calculates the maximum PSD. At 480, method 400 determines whether there is an improvement. If there is an improvement ("YES"), method 400 returns to 470 and increases the second parameter again by the predetermined amount. At 472, method 400 measures the cabin sound resulting from the increased second parameter, calculates the max PSD at 475, and then determines whether there is an improvement at 480. Method 400 thus continues to increase the second parameter by the predetermined amount until there is no improvement at 480 ("NO"). Method 400 then proceeds to 485. At 485, method 400 reverts the second parameter to the value of the second parameter in the previous iteration.

At 490, method 400 ends the PWM scheme update. Method 400 then returns. Thus, during the example PWM scheme update of method 400, each parameter of the PWM scheme is iteratively perturbed with incremental changes until the incremental parameter change does not yield a positive response or improvement in the cabin sound. In the depicted example, there are two degrees of freedom (i.e., the first parameter and the second parameter) and two potential changes for each degree of freedom (i.e., an increase or a decrease) for a total of four different PWM scheme alterations. Method 400 performs each possible PWM scheme alteration in succession, with the metric (e.g., the max PSD) used to decide between halting the alteration process or moving on to the next possible alteration. Method 400 finally ends when all potential parameters have been altered without a positive change.

As an illustrative example, FIG. 5 shows a graph 500 illustrating a first set of example parameter values over time obtained via the example method 400 of FIG. 4. The graph 500 includes a first set of example parameter values 510 for the first parameter $F_\mu$ and a second set of example parameter values 520 for the second parameter $F_A$. As depicted by the parameter values 510, the value of the first parameter gradually increases from the first iteration to the fourth iteration and then remains consistent for the remaining iterations. As depicted by the parameter values 520, the value of the second parameter is unchanged from the first iteration through the fourth iteration but begins to gradually increase at the fifth and sixth iterations. Thus, the first parameter is adjusted by increasing the first parameter by the predetermined amount until such perturbations no longer yield an improvement after the fourth iteration, at which point the second parameter is adjusted by increasing the second parameter by the predetermined amount until such perturbations no longer yield an improvement after the seventh iteration, and the adaptation scheme ends.

As another illustrative example, FIG. 6 shows a graph 600 illustrating a second set of example parameter values over time obtained via the example method 400 of FIG. 4, including a first set of parameter values 610 for the first parameter and a second set of parameter values 620 for the second parameter of a PWM scheme parameterized with two degrees of freedom as discussed hereinabove. As depicted by the parameter values 610, the value of the first parameter gradually increases during each iteration from the first iteration to the fourth iteration, decreases from the fourth iteration to the fifth iteration, and remains unchanged for the remaining iterations. As depicted by the parameter values 620, the value of the second parameter is unchanged for the first five iterations and then begins gradually increasing for the remaining iterations.

In the examples depicted in FIGS. 5 and 6, the sequential order of parameter adjustments is arbitrary, such that the outcome is similar whether the first parameter is adjusted before the second parameter or the second parameter before the first parameter. That is, although the first parameter is perturbed prior to performing any adjustments to the second parameter, as depicted, it should be appreciated that the second parameter may be perturbed prior to performing adjustments to the first parameter. The sequence of adjusting a parameter in one direction followed by adjusting the same parameter in the opposite direction, however, is advantageous because the vehicle operating point is constantly changing and the estimation of PSD is inherently stochastic. By allowing a parameter shift to reverse direction, the adaptation scheme is better able to handle changes in vehicle operating point and anomalous PSD estimations. In the example of FIG. 6, the advantage of the method of FIG. 4 is illustrated when the direction of the parameter adjustment for the first parameter reverses at the fifth iteration due to either a change in operating conditions or due to an anomalous PSD estimate (and therefore an erroneous adaptation) at the fourth iteration. Thus, as depicted in FIG. 6, the first parameter is initially increased for the first four iterations, and then decreased at the fifth iteration. As further adjustments to the first parameter no longer yield an improvement after the fifth iteration, adjustments to the second parameter are applied until such adjustments no longer yield an improvement after the seventh iteration.

Figure 7:
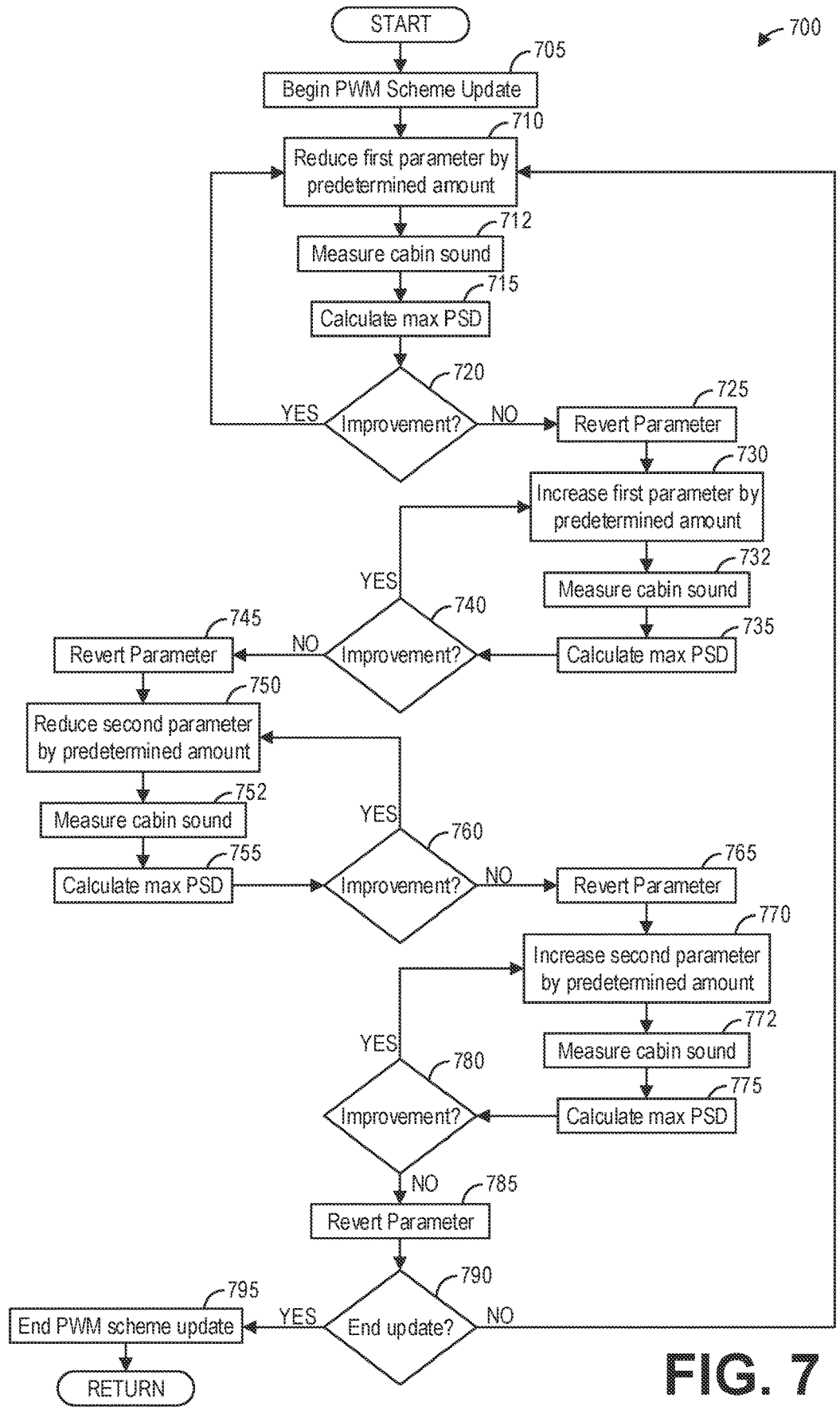
FIG. 7 shows a high-level flow chart illustrating an example method for continuously adapting pulse width modulation with two degrees of freedom.
Figure 8:
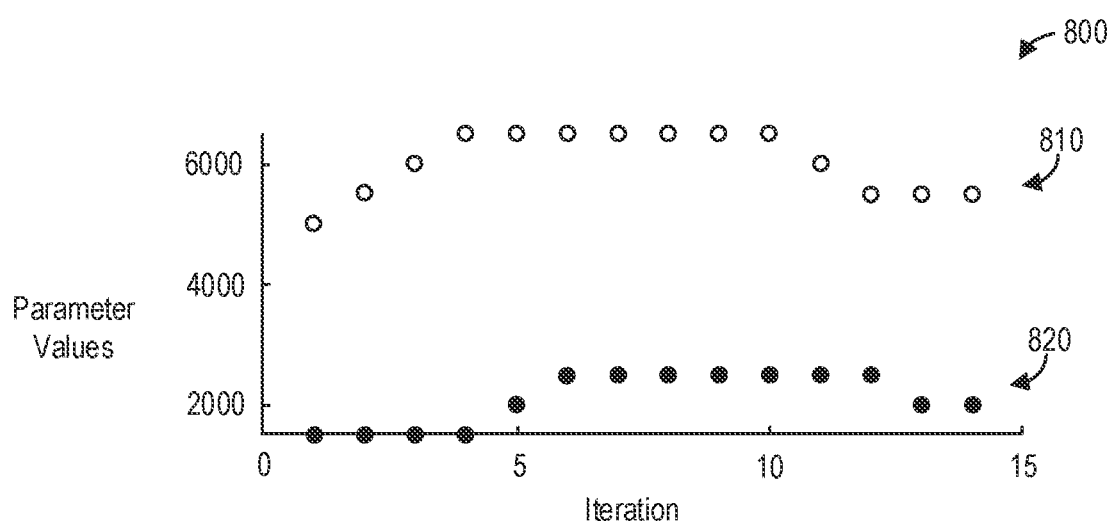
FIG. 8 shows a graph illustrating example parameter values over time obtained via the example method of FIG. 7.

FIG. 7 shows a high-level flow chart illustrating an example method 700 for continuously adapting pulse width modulation with two degrees of freedom, such as a first parameter and a second parameter of a PWM scheme parameterized with two such parameters. Method 700 may be implemented as executable instructions stored in non-transitory memory 110 of the controller 12, for example, that when executed by processor 106 of the controller 12 cause the controller 12 to perform the actions described herein.

Method 700 begins at 705. At 705, method 700 begins a PWM scheme update. Method 700 begins a PWM scheme update at 705 responsive to determining to begin a PWM update, such as described hereinabove with regard to FIG. 3. For example, method 700 may perform a PWM scheme update continuously whenever the PWM scheme is active, and so method 700 may begin the PWM scheme update responsive to the PWM scheme activating or beginning. In other examples, method 700 may perform the PWM scheme update responsive to specific operating conditions that trigger the adaptation, including but not limited to changes in a vehicle operating point, such as changes to speed or torque demand, or changes to the in-vehicle or cabin acoustic environment (e.g., when a radio is turned off, a phone call is ended, a conversation between vehicle occupants begins or ends, road surface sounds audibly change within the vehicle due to change in road surfaces, and so on) as evaluated based on an in-cabin microphone and/or a status of an in-vehicle multimedia unit.

At 710, method 700 reduces a first parameter by a predetermined amount. The first parameter comprises a parameter of the parameterized PWM scheme. For example, as discussed hereinabove, the PWM scheme may be parameterized by a first parameter $F_\mu$ and a second parameter $F_A$. Method 700 may therefore reduce the first parameter $F_\mu$ by the predetermined amount. The predetermined amount may comprise a percentage of the first parameter and therefore the predetermined amount may depend on the current value of the first parameter. As an illustrative example, the predetermined amount may comprise 10% of the first parameter, though it should be appreciated that the predetermined amount may comprise a percentage greater than 10% or less than 10% in some examples. Method 700 may therefore reduce the first parameter $F_\mu$ by 10% for a subsequent iteration of the PWM scheme. In other examples, the predetermined amount may comprise an amount that is independent of the current value of the first parameter. In all examples, method 700 perturbs the first parameter by the predetermined amount.

After reducing or perturbing the first parameter by the predetermined amount, method 700 evaluates the in-vehicle sound to determine whether the perturbation improved the PWM acoustic emissions. To that end, at 712, method 700 measures cabin sound, for example via an in-cabin microphone suitable for measuring PWM acoustic emissions. At 715, method 700 calculates the maximum PSD of the measured cabin sound as discussed hereinabove.

At 720, method 700 determines whether there is an improvement in the cabin sound resulting from the perturbation of the PWM scheme parameter at 710. If there is an improvement ("YES"), method 700 returns to 710 and reduces the first parameter again by the predetermined amount. At 712, method 700 measures the cabin sound resulting from the reduced first parameter, calculates the max PSD at 715, and then determines whether there is an improvement at 720. Method 700 thus continues to reduce the first parameter by the predetermined amount until there is no improvement at 720 ("NO"). Method 700 then proceeds to 725. At 725, method 700 reverts the first parameter to the value of the first parameter in the previous iteration.

At 730, method 700 increases the first parameter by a predetermined amount. The predetermined amount may comprise the same predetermined amount at 710, such as 10% of the value of the first parameter. After perturbing the first parameter by the predetermined amount, method 700 continues to 732. At 732, method 700 measures the cabin sound via the in-cabin microphone, and then at 735, method 700 calculate the max PSD of the measured cabin sound.

At 740, method 700 determines whether there is an improvement in the cabin sound resulting from the increase of the first parameter at 730. If there is an improvement ("YES"), method 700 returns to 730 and increases the first parameter again by the predetermined amount. Method 700 then measures the cabin sound resulting from the increased first parameter at 732, calculates the max PSD at 735, and then determines whether there is an improvement at 740.

Method 700 thus continues to increase the first parameter by the predetermined amount until there is no improvement at 740 ("NO"). Method 700 then proceeds to 745. At 745, method 700 reverts the first parameter to the value of the first parameter in the previous iteration.

Continuing at 750, method 700 reduces a second parameter by a predetermined amount. For example, method 700 may reduce the second parameter $F_A$ of the PWM scheme when parameterized with two degrees of freedom as discussed hereinabove. Similar to the predetermined amount at 710 and 730, the predetermined amount at 750 may comprise a percentage of the second parameter and therefore the predetermined amount may depend on the current value of the second parameter. As an illustrative example, the predetermined amount may comprise 10% of the second parameter, though it should be appreciated that the predetermined amount may comprise a percentage greater than 10% or less than 10% in some examples. Method 700 may therefore reduce the second parameter $F_A$ by 10% for a subsequent iteration of the PWM scheme. In other examples, the predetermined amount may comprise an amount that is independent of the current value of the second parameter. In all examples, method 700 perturbs the second parameter by the predetermined amount. Further, while the predetermined amounts at 710, 730, and 750 may comprise a similar predetermined amount (e.g., a same percentage of the current value of the parameter being perturbed), the predetermined amounts for the first parameter and the second parameter may be different in some examples, depending on how the PWM scheme is parameterized. For example, if a parameter is more or less sensitive to perturbations relative to another parameter, the percentage of the parameter for the perturbing the parameter may be lesser or greater than the percentage of the other parameter for perturbing the other parameter.

After perturbing the second parameter at 750, method 700 continues to 752. At 752, method 700 measures the cabin sound via the in-cabin microphone. At 755, method 700 calculates the maximum PSD of the measured cabin sound obtained at 752.

At 760, method 700 determines whether there is an improvement in the cabin sound resulting from the perturbation to the second parameter as indicated by the maximum PSD. If there is an improvement ("YES"), method 700 returns to 750 and reduces the second parameter again by the predetermined amount. Method 700 then measures the cabin sound resulting from the reduced second parameter at 752, calculates the max PSD at 755, and then determines whether there is an improvement at 760. Method 700 thus continues to reduce the second parameter by the predetermined amount until there is no improvement at 760 ("NO"). Method 700 then proceeds to 765. At 765, method 700 reverts the second parameter to the value of the second parameter in the previous iteration.

Continuing at 770, method 700 increases the second parameter by the predetermined amount. Method 700 may increase the second parameter by the same predetermined amount used at 750, for example. At 772, method 700 measures the cabin sound, and at 775, method 700 calculates the maximum PSD of the measured cabin sound.

At 780, method 700 determines whether there is an improvement in the cabin sound resulting from the perturbation of the second parameter. If there is an improvement ("YES"), method 700 returns to 770 and increases the second parameter again by the predetermined amount. Method 700 measures the cabin sound resulting from the increased second parameter at 772, calculates the max PSD at 775, and then determines whether there is an improvement at 780. Method 700 thus continues to increase the second parameter by the predetermined amount until there is no improvement at 780 ("NO"). Method 700 then proceeds to 785. At 785, method 700 reverts the second parameter to the value of the second parameter in the previous iteration.

At 790, method 700 determines whether to end the PWM scheme update. Method 700 may determine to end the PWM scheme update, for example, if the PWM scheme itself ends. Method 700 thus determines whether the PWM scheme is still active, and decides to end the PWM scheme update if the PWM scheme is no longer active. If method 700 determines not to end the update ("NO"), method 700 returns to 710 to reduce the first parameter by the predetermined amount. Method 700 may thus repeatedly adjust the first parameter and the second parameter to improve the cabin sound as measured via the metric (e.g., the PSD), until method 700 determines to end the update ("YES") at 790. Method 790 then continues to 795. At 795, method 700 ends the PWM scheme update. Method 700 then returns.

Thus, the adaptation method 700 runs continuously while a PWM scheme is active, even if no adaptation of PWM scheme parameters occurs for a number of iterations. As an illustrative example, FIG. 8 shows a graph 800 illustrating example parameter values over time obtained via the example method 700 of FIG. 7, including a first set of parameter values 810 for the first parameter and a second set of parameter values 820 for the second parameter. As depicted, the first parameter is increased for the first four iterations, and the second parameter is increased for the next two iterations. From the sixth iteration to the tenth iteration, however, perturbations to both parameters do not result in improvements and so neither parameter is adjusted. The first parameter is reduced from the tenth iteration to the twelfth iteration, and the second parameter is reduced from the twelfth iteration to the thirteenth iteration. The fourteenth iteration results in no changes to either parameter.

Thus, according to the continuous adaptation method depicted in FIG. 7 and illustrated in FIG. 8, once the update is triggered the method 700 cycles through the different parameter adjustments, and starts over with the first parameter adjustment once all parameter adjustments are exhausted. The method 700 thus tracks optimal behavior for the PWM scheme as the acoustic cabin noise profile and the vehicle operating point changes during a drive cycle. As depicted in the evolution of the PWM scheme parameters shown in FIG. 8, the adaptation scheme reaches optimal behavior and ceases adaptation for a number of iterations. The method continuously searches for an improvement, even if no improvement is available, and once the acoustic cabin noise profile and/or the operating point change enough to show an improvement with parameter variations, the adaptation continues.

Figure 9:
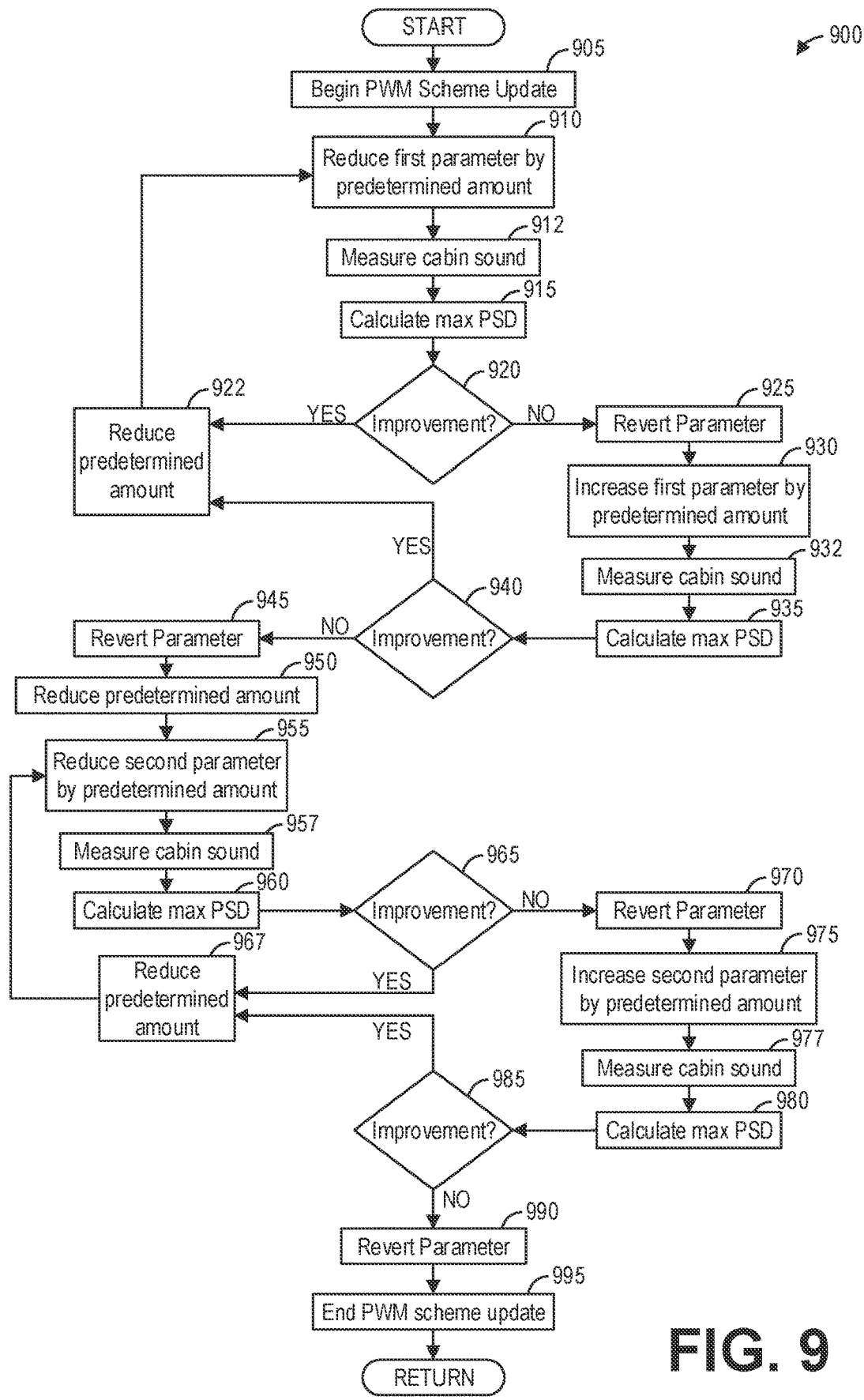
FIG. 9 shows a high-level flow chart illustrating another example method for adapting pulse width modulation with two degrees of freedom and diminishing perturbations.

FIG. 9 shows a high-level flow chart illustrating another example method 900 for adapting pulse width modulation with two degrees of freedom, such as a first parameter and a second parameter of a PWM scheme parameterized with two such parameters. In particular, method 900 modifies the adaptive methods described hereinabove with regard to FIGS. 4 and 7 by diminishing the magnitude of the perturbations or alterations as described further herein below. Method 900 may be implemented as executable instructions stored in non-transitory memory 110 of the controller 12, for example, that when executed by processor 106 of the controller 12 cause the controller 12 to perform the actions described herein.

Method 900 begins at 905. At 905, method 900 begins a PWM scheme update. Method 900 begins a PWM scheme update at 905 responsive to determining to begin a PWM update, such as described hereinabove with regard to FIG. 3. For example, method 900 may perform a PWM scheme update continuously whenever the PWM scheme is active, and so method 900 may begin the PWM scheme update responsive to the PWM scheme activating or beginning. In other examples, method 900 may perform the PWM scheme update responsive to specific operating conditions that trigger the adaptation, including but not limited to changes in a vehicle operating point, such as changes to speed or torque demand, or changes to the in-vehicle or cabin acoustic environment (e.g., when a radio is turned off, a phone call is ended, a conversation between vehicle occupants begins or ends, road surface sounds audibly change within the vehicle due to change in road surfaces, and so on) as evaluated based on an in-cabin microphone and/or a status of an in-vehicle multimedia unit.

At 910, method 900 reduces a first parameter by a predetermined amount. The first parameter comprises a parameter of the parameterized PWM scheme. For example, as discussed hereinabove, the PWM scheme may be parameterized by a first parameter $F_\mu$ and a second parameter $F_A$. Method 900 may therefore reduce the first parameter $F_\mu$ by the predetermined amount. The predetermined amount may comprise a percentage of the first parameter and therefore the predetermined amount may depend on the current value of the first parameter. As an illustrative example, the predetermined amount may comprise 10% of the first parameter, though it should be appreciated that the predetermined amount may comprise a percentage greater than 10% or less than 10% in some examples. Method 900 may therefore reduce the first parameter $F_\mu$ by 10%. In other examples, the predetermined amount may comprise an amount that is independent of the current value of the first parameter. In all examples, method 900 perturbs the first parameter by the predetermined amount.

After reducing the first parameter by the predetermined amount, method 900 continues to 912. At 912, method 900 measures cabin sound via an in-cabin microphone, and at 915, method 900 calculates the maximum PSD of the measured cabin sound.

At 920, method 900 determines whether there was an improvement in the cabin sound resulting from the perturbation of the PWM scheme parameter at 910. If there is an improvement ("YES"), method 900 proceeds to 922. At 922, method 900 reduces the predetermined amount. For example, method 900 may reduce the predetermined amount by half. In examples wherein the predetermined amount is initially 10% of the parameter being adjusted, method 900 may therefore reduce the predetermined amount to 5% of the parameter being adjusted.

After reducing the predetermined amount at 922, method 900 then returns to 910 and reduces the first parameter again by the reduced predetermined amount. Method 900 then measures the cabin sound resulting from the reduced first parameter at 912, calculates the max PSD at 915, and determines whether there is an improvement at 920. Method 900 thus continues to reduce the first parameter by the predetermined amount, and reducing the predetermined amount during each iteration, until there is no improvement at 920 ("NO"). Method 900 then proceeds to 925. At 925, method 900 reverts the first parameter to the value of the first parameter in the previous iteration.

At 930, method 900 increases the first parameter by the predetermined amount. The predetermined amount may comprise the last reduced predetermined amount used during the most recent iteration. At 932, method 900 measures the cabin sound, and at 935, method 900 calculates the max PSD of the measured cabin sound.

At 940, method 900 determines whether there is an improvement. If there is an improvement ("YES"), method 900 continues to 922 and reduces the predetermined amount. Rather than return to 930 to continue increasing the first parameter by the newly-reduced predetermined amount, however, method 900 continues from 922 to 910 to reduce the first parameter by the newly-reduced predetermined amount.

Method 900 thus continues to adjust the first parameter, further reducing the predetermined amount when there are improvements in the cabin sound, until there is no longer any improvement resulting from perturbations to the first parameter, which occurs when method 900 determines there is no improvement at 740 ("NO"). Method 900 then proceeds to 945. At 945, method 700 reverts the first parameter to the value of the first parameter in the previous iteration.

Continuing at 950, method 900 reduces the predetermined amount. Method 900 may reduce the predetermined amount by half such that the predetermined amount M equals M/2, for example. In this way, even if no perturbations to the first parameter resulted in improvements and so the predetermined amount was not reduced at 922 during a previous iteration, method 900 reduces the predetermined amount prior to attempting perturbations to the second parameter.

Continuing at 955, method 900 reduces the second parameter by the predetermined amount. For example, method 900 may reduce the second parameter $F_A$ of the PWM scheme when parameterized with two degrees of freedom as discussed hereinabove with the predetermined amount reduced at 950. At 957, method 900 measures the cabin sound via an in-cabin microphone, and at 960, method 900 calculates the maximum PSD of the measured cabin sound.

At 965, method 900 determines whether there is an improvement to the cabin sound resulting from the perturbation of the second parameter at 955. If there is an improvement ("YES"), method 900 continues to 967. At 967, method 900 reduces the predetermined amount. As an illustrative example, method 900 reduces the predetermined amount by half. Method 900 then returns to 955 to reduce the second parameter again by the newly-reduced predetermined amount. Method 900 then measures the cabin sound resulting from the reduced second parameter at 957, calculates the max PSD at 960, and then determines whether there is an improvement at 965.

Method 900 thus continues to reduce the second parameter by the predetermined amount, with further reductions in the predetermined amount applied at 967, until there is no improvement at 965 ("NO"). Method 900 then proceeds to 970. At 970, method 900 reverts the second parameter to the value of the second parameter in the previous iteration.

Continuing at 975, method 900 increases the second parameter by the predetermined amount. Method 900 increases the second parameter by the most recent value of the predetermined amount. At 977, method 900 measures the cabin sound, and at 980, method 900 calculates the maximum PSD of the measured cabin sound.

At 985, method 900 determines whether there is an improvement to the cabin sound resulting from the increase of the second parameter at 975. If there is an improvement ("YES"), method 900 continues to 967 and reduces the predetermined amount. Method 900 then returns to 955 to reduce the second parameter. Method 900 thus continues to reduce the second parameter and increase the second parameter by the predetermined amount, with corresponding reductions in the predetermined amount responsive to improvements, until there is no improvement at 985 ("NO"). Method 900 then proceeds to 990. At 990, method 900 reverts the second parameter to the value of the second parameter in the previous iteration.

At 995, method 900 ends the PWM scheme update. Method 900 then returns. It should be appreciated that during subsequent executions of method 900, the predetermined amount is initialized to the initial predetermined amount (e.g., 10%) when the PWM scheme update begins, such that subsequent iterations of method 900 do not rely on diminished values of the predetermined amount from previous iterations of method 900.

Thus, method 900 alters the first degree of freedom or the first parameter with successively smaller changes until there is no improvement, and then alters the second degree of freedom or the second parameter with successively smaller changes until there is no improvement. It should be appreciated that the method 900 may be easily expanded to include additional degrees of freedom. It should also be appreciated that method 900 may be adapted to run continuously while the PWM scheme is active, similar to method 700 of FIG. 7, wherein the predetermined amount M may be initialized to the initial value after completing a full run of method 900. Further, method 900 may be adapted to be halted if the conditions for PWM adaptations are no longer met (e.g., there is talking in the cabin, music is turned on in the cabin, and so on).

As an illustrative example, FIG. 10 shows a graph 1000 illustrating example parameter values over time obtained via the example method 900 of FIG. 9, including a first set of parameter values 1010 for the first parameter and a second set of parameter values 1020 for the second parameter. As depicted, the first parameter is first adjusted with successively smaller adjustments from the first iteration through the fifth iteration. In particular, the first parameter increases from the first iteration to the second iteration by a first amount, decreases from the second iteration to the third iteration by a second amount, decreases from the third iteration to the fourth iteration by a third amount, and increases from the fourth iteration to the fifth iteration by a fourth amount, wherein the first amount is greater than the second amount, the second amount is greater than the third amount, and the third amount is greater than the fourth amount. Once further changes to the first parameter no longer yield improvements, method 900 proceeds to adjust the second parameter in a similar way. As depicted, the predetermined amounts for changing the second parameter are re-initialized such that the diminished values for adjusting the first parameter are not immediately applied to the second parameter. However, as discussed hereinabove with regard to FIG. 9, the last predetermined amount used to adjust the first parameter may be used for the first adjustment of the second parameter, with successively reduced amounts for successive adjustments to the second parameter thereafter. In either case, the technique of reducing the predetermined amount responsive to improvements described hereinabove with regard to FIG. 9 improves the final optimality by enabling the parameter values to more quickly converge to a parameter value.

To further illustrate the PWM scheme adaptation methods described herein, FIGS. 11 and 12 depict example measurements during adaptation of PWM scheme parameters according to the method 400 of FIG. 4. In particular, FIG. 11 shows a graph 1100 illustrating example power spectral densities 1110 measured during adaptation of the PWM scheme parameters, while FIG. 12 shows a graph 1200 depicting the PWM scheme parameter values and a graph 1250 depicting the resulting PWM switching frequencies 1260. The graph 1100 of FIG. 11 depicts the evolution of the estimated PSDs 1110 in general, while the arrow 1130 indicates the shrinking PSD peak as the parameters are adapted. As depicted, the highest peak of the PSD decreases in value as well as frequency as the parameters are adjusted according to the method 400. In the depicted example, the PSDs are estimated using Welch's method with a six-second window split into 120 sub-windows to balance adaptation speed and accuracy, though it should be appreciated that the PSD estimation technique and estimation parameters may be adjusted.

The graph 1200 of FIG. 12 shows a first set of parameter values 1210 for the first parameter and a second set of parameter values 1220 for the second parameter. As depicted, the first parameter is gradually decreased from the first iteration to the third iteration, and then the second parameter is gradually increased from the third iteration to the seventh iteration. The adaptation of the PWM scheme parameters, and in particular the initial decreasing of the first parameter, initially results in a lower of the mean switching frequency, as indicated by the switching frequencies 1260 gradually decreasing in value for the first three iterations as the first parameter is gradually decreased. This decrease in mean switching frequency occurs because in the particular parametrization of the PWM scheme, the first parameter comprises the mean switching frequency. Further, as the second parameter gradually increases from the third iteration to the seventh iteration, the distance between the switching frequencies 1260 increases. This increase in spacing between the switching frequencies occurs because the second parameter comprises a delta frequency parameter in the parameterization of the PWM scheme which comprises the distance between the switching frequencies. As mentioned hereinabove, the adjustments to the first parameter and the second parameter depicted in graph 1200 and the resulting adjustments to the switching frequencies 1260 depicted in graph 1250 result in a substantial decrease in the maximum PSD as depicted in FIG. 11. In other words, the adaptation of the PWM scheme parameters according to method 400 results in a considerable reduction in PWM acoustic emissions audible within the vehicle cabin.

To even further illustrate the PWM scheme adaptation methods described herein, FIGS. 13 and 14 depict example measurements during adaptation of PWM scheme parameters according to the method 400 of FIG. 4. In particular, a five-frequency PWM scheme is parameterized as:

$$F_S|_{F_\mu, F_{\Delta_1}, F_{\Delta_2}} = F_\mu + [-F_{\Delta_2} \quad -F_{\Delta_1} \quad 0 \quad F_{\Delta_1} \quad F_{\Delta_2}],$$

where the switching frequencies $F_s$ are parameterized in terms of the three parameters $F_\mu$, $F_{\Delta_1}$, and $F_{\Delta_2}$.

FIG. 13 thus shows a graph 1300 illustrating example power spectral densities 1310 measured during adaptation of the PWM scheme parameters, while FIG. 14 shows a graph 1400 depicting the PWM scheme parameter values and a graph 1450 depicting the resulting PWM switching frequencies 1460. The graph 1300 of FIG. 13 depicts the evolution of the estimated PSDs 1310 in general, while the arrow 1330 indicates the shrinking PSD peak as the parameters are adapted. As depicted, the highest peak of the PSD decreases in value as well as frequency as the parameters are adjusted according to the method 400.

The graph 1400 of FIG. 14 shows a first set of parameter values 1410 for the first parameter $F_\mu$, a second set of parameter values 1420 for the second parameter $F_{A_1}$, and a third set of parameter values 1430 for the third parameter $F_{A_2}$. As depicted, the first parameter decreases until the third iteration, resulting in a reduction in the mean switching frequency as depicted in the graph 1450 until the third iteration; the mean switching frequency then remains fixed for the remainder of the iterations while the second and third parameters are adjusted. In particular, the second parameter is increased from the third iteration until the thirteenth iteration while the first and third parameters remain unchanged. Notably, the second and third parameters are equal at the seventh iteration as depicted. It is possible that the third parameter would increase from the seventh iteration onwards instead of the second parameter, but given that the adaptation sequence perturbs the second parameter prior to perturbing the third parameter results in the second parameter being adjusted instead. Thus, the mean center switching frequency is first reduced, and then the first, smaller delta frequency term is then increased gradually until no further improvements are available after the thirteenth iteration.

The technical effect of modulating or perturbing PWM parameters as described herein is the adjustment of the rate of opening and closing electronic switches for transferring power from a battery to an electric machine such as a motor. Another technical effect of the present disclosure is the reduction of PWM acoustic emissions within a vehicle cabin regardless of the PWM implementation strategy or operating mode. Another technical effect of the present disclosure includes the dynamic adjustments to one or more switching frequencies responsive to and based on sound measured in a vehicle cabin.

As one embodiment, a method for controlling an electrified powertrain of a vehicle with PWM includes modulating a PWM switching frequency with a perturbation, and controlling the electrified powertrain with the modulated PWM switching frequency responsive to sound measured in a cabin of the vehicle indicating a noise improvement responsive to the perturbation. In a first example of the method, the method further comprises reverting the modulated PWM switching frequency to the PWM switching frequency and controlling the electrified powertrain with the PWM switching frequency responsive to the sound measured in the cabin of the vehicle not indicating the noise improvement responsive to the perturbation. In a second example of the method optionally including the first example, modulating the PWM switching frequency with the perturbation comprises increasing the PWM switching frequency according to the perturbation, and controlling the electrified powertrain with the increased PWM switching frequency responsive to sound measured in the cabin of the vehicle indicating a noise improvement responsive to the increased PWM switching frequency. In a third example of the method optionally including one or more of the first and second examples, modulating the PWM switching frequency with the perturbation further comprises reverting the increased PWM switching frequency to the PWM switching frequency responsive to the sound measured in the cabin of the vehicle not indicating the noise improvement responsive to the increased PWM switching frequency, decreasing the PWM switching frequency according to the perturbation, and controlling the electrified powertrain with the decreased PWM switching frequency responsive to sound measured in the cabin of the vehicle indicating a noise improvement responsive to the decreased PWM switching frequency. In a fourth example of the method optionally including one or more of the first through third examples, PWM switching frequencies are parameterized with at least two PWM parameters, and modulating the PWM switching frequency with the perturbation comprises adjusting a PWM parameter with the perturbation, wherein adjusting the PWM parameter with the perturbation increases or decreases one or more of the PWM switching frequencies including the PWM switching frequency. In a fifth example of the method optionally including one or more of the first through fourth examples, adjusting the PWM parameter with the perturbation comprises sequentially adjusting each PWM parameter of the at least two PWM parameters. In a sixth example of the method optionally including one or more of the first through fifth examples, the method further comprises sequentially adjusting each PWM parameter of the at least two PWM parameters until perturbations of the at least two PWM parameters no longer yield noise improvements in sound measured in the cabin of the vehicle. In a seventh example of the method optionally including one or more of the first through sixth examples, the method further comprises sequentially adjusting each PWM parameter of the at least two PWM parameters until control of the electrified powertrain with PWM ends. In an eighth example of the method optionally including one or more of the first through seventh examples, the method further comprises reducing the perturbation responsive to the measured sound indicating the noise improvement responsive to the perturbation, further modulating the modulated PWM switching frequency with the reduced perturbation, and controlling the electrified powertrain with the further-modulated PWM switching frequency responsive to sound measured in the cabin of the vehicle indicating a noise improvement responsive to the reduced perturbation. In a ninth example of the method optionally including one or more of the first through eighth examples, the method further comprises measuring the sound in the cabin with an on-board microphone of the vehicle configured for recording vocal commands, the measured sound including both a masking sound component and a PWM sound component. In a tenth example of the method optionally including one or more of the first through ninth examples, the method further comprises calculating a noise quality metric from the measured sound, and determining the measured sound indicates the noise improvement responsive to the perturbation when the noise quality metric is reduced relative to a preceding calculation of the noise quality metric.

In another embodiment, a method includes controlling an electrified powertrain of a vehicle with a set of PWM switching frequencies, adjusting a PWM parameter with a perturbation to modulate at least one PWM switching frequency of the set of PWM switching frequencies, and responsive to sound measured in a cabin of the vehicle indicating a noise improvement after the perturbation, controlling the electrified powertrain with a modulated set of PWM switching frequencies including the at least one PWM switching frequency modulated according to the perturbation. In a first example of the method, the method further includes adjusting a second PWM parameter with a second perturbation to modulate at least one PWM switching frequency of the modulated set of PWM switching frequencies, and responsive to sound measured in the cabin indicating a noise improvement after the second perturbation, controlling the electrified powertrain with a second modulated set of PWM switching frequencies including the at least one PWM switching frequency modulated according to the second perturbation. In a second example of the method optionally including the first example, the method further includes adjusting the adjusted PWM parameter with a reduced perturbation to further modulate the at least one modulated PWM switching frequency of the modulated set of PWM switching frequencies responsive to the noise improvement after the perturbation, and responsive to sound measured in a cabin of the vehicle indicating a noise improvement after the reduced perturbation, controlling the electrified powertrain with a second modulated set of PWM switching frequencies including the at least one PWM switching frequency modulated according to the reduced perturbation. In a third example of the method optionally including one or more of the first and second examples, the method further includes measuring the sound in the cabin via an on-board microphone after adjusting the PWM parameter with the perturbation, calculating a noise quality metric for the sound, determining that the sound indicates the noise improvement if the noise quality metric is reduced relative to a noise quality metric calculated for sound measured before the perturbation, and determining that the sound does not indicate the noise improvement if the noise quality metric is not reduced relative to the noise quality metric calculated for the sound measured before the perturbation.

In yet another embodiment, a system for a vehicle includes a plurality of drive wheels, an electric motor configured to deliver torque to the plurality of drive wheels, a battery configured to provide power to the electric motor, a switching system comprising electronic switches that selectively open and close responsive to pulse width modulated (PWM) signals to transfer the power from the battery to the electric motor, and a controller storing instructions that when executed cause the controller to: modulate a PWM switching frequency with a perturbation; and control the switching system with the modulated PWM switching frequency responsive to sound measured in a cabin of the vehicle indicating a noise improvement responsive to the perturbation. In a first example of the system, the system further includes an on-board microphone positioned in the cabin and configured for recording vocal commands of vehicle occupants, and the controller further stores instructions that when executed cause the controller to: measure the sound in the cabin of the vehicle with the on-board microphone after modulating the PWM switching frequency with the perturbation; calculate a noise quality metric for the measured sound; and determine the measured sound indicates the noise improvement when the noise quality metric is reduced relative to a noise quality metric calculated for sound measured before the perturbation. In a second example of the system optionally including the first example, the controller further stores instructions that when executed cause the controller to: revert the modulated PWM switching frequency to the PWM switching frequency; and control the switching system with the PWM switching frequency responsive to the sound measured in the cabin of the vehicle not indicating the noise improvement responsive to the perturbation. In a third example of the system optionally including one or more of the first and second examples, to modulate the PWM switching frequency with the perturbation, the controller further stores instructions that when executed cause the controller to: increase the PWM switching frequency according to the perturbation; and control the switching system with the increased PWM switching frequency responsive to sound measured in the cabin of the vehicle indicating a noise improvement responsive to the increased PWM switching frequency. In a fourth example of the system optionally including one or more of the first through third examples, responsive to the sound measured in the cabin of the vehicle not indicating the noise improvement responsive to the increased PWM switching frequency, the controller further stores instructions that when executed cause the controller to: revert the increased PWM switching frequency to the PWM switching frequency; decrease the PWM switching frequency according to the perturbation; and control the switching system with the decreased PWM switching frequency responsive to sound measured in the cabin of the vehicle indicating a noise improvement responsive to the decreased PWM switching frequency.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an electrified powertrain of a vehicle with pulse width modulation (PWM), the method comprising:
   modulating a PWM switching frequency with a perturbation; and
   controlling the electrified powertrain with the modulated PWM switching frequency responsive to sound measured in a cabin of the vehicle indicating a noise improvement responsive to the perturbation.

2. The method of claim 1, further comprising reverting the modulated PWM switching frequency to the PWM switching frequency and controlling the electrified powertrain with the PWM switching frequency responsive to the sound measured in the cabin of the vehicle not indicating the noise improvement responsive to the perturbation.

3. The method of claim 1, wherein modulating the PWM switching frequency with the perturbation comprises:
   increasing the PWM switching frequency according to the perturbation; and
   controlling the electrified powertrain with the increased PWM switching frequency responsive to sound measured in the cabin of the vehicle indicating a noise improvement responsive to the increased PWM switching frequency.

4. The method of claim 3, wherein modulating the PWM switching frequency with the perturbation further comprises:
   reverting the increased PWM switching frequency to the PWM switching frequency responsive to the sound measured in the cabin of the vehicle not indicating the noise improvement responsive to the increased PWM switching frequency;
   decreasing the PWM switching frequency according to the perturbation; and
   controlling the electrified powertrain with the decreased PWM switching frequency responsive to sound measured in the cabin of the vehicle indicating a noise improvement responsive to the decreased PWM switching frequency.

5. The method of claim 1, wherein PWM switching frequencies are parameterized with at least two PWM parameters, wherein modulating the PWM switching frequency with the perturbation comprises adjusting a PWM parameter with the perturbation, wherein adjusting the PWM parameter with the perturbation increases or decreases one or more of the PWM switching frequencies including the PWM switching frequency.

6. The method of claim 5, wherein adjusting the PWM parameter with the perturbation comprises sequentially adjusting each PWM parameter of the at least two PWM parameters.

7. The method of claim 6, further comprising sequentially adjusting each PWM parameter of the at least two PWM parameters until perturbations of the at least two PWM parameters no longer yield noise improvements in sound measured in the cabin of the vehicle.

8. The method of claim 6, further comprising sequentially adjusting each PWM parameter of the at least two PWM parameters until control of the electrified powertrain with PWM ends.

9. The method of claim 1, further comprising:
   reducing the perturbation responsive to the measured sound indicating the noise improvement responsive to the perturbation;
   further modulating the modulated PWM switching frequency with the reduced perturbation; and
   controlling the electrified powertrain with the further-modulated PWM switching frequency responsive to sound measured in the cabin of the vehicle indicating a noise improvement responsive to the reduced perturbation.

10. The method of claim 1, further comprising measuring the sound in the cabin with an on-board microphone of the vehicle configured for recording vocal commands, the measured sound including both a masking sound component and a PWM sound component.

11. The method of claim 1, further comprising calculating a noise quality metric from the measured sound, and determining the measured sound indicates the noise improvement responsive to the perturbation when the noise quality metric is reduced relative to a preceding calculation of the noise quality metric.

12. A method, comprising:
   controlling an electrified powertrain of a vehicle with a set of PWM switching frequencies;
   adjusting a PWM parameter with a perturbation to modulate at least one PWM switching frequency of the set of PWM switching frequencies; and
   responsive to sound measured in a cabin of the vehicle indicating a noise improvement after the perturbation, controlling the electrified powertrain with a modulated set of PWM switching frequencies including the at least one PWM switching frequency modulated according to the perturbation.

13. The method of claim 12, further comprising:
   adjusting a second PWM parameter with a second perturbation to modulate at least one PWM switching frequency of the modulated set of PWM switching frequencies; and
   responsive to sound measured in the cabin indicating a noise improvement after the second perturbation, controlling the electrified powertrain with a second modulated set of PWM switching frequencies including the at least one PWM switching frequency modulated according to the second perturbation.

14. The method of claim 12, further comprising:
   adjusting the adjusted PWM parameter with a reduced perturbation to further modulate the at least one modulated PWM switching frequency of the modulated set of PWM switching frequencies responsive to the noise improvement after the perturbation; and
   responsive to sound measured in a cabin of the vehicle indicating a noise improvement after the reduced perturbation, controlling the electrified powertrain with a second modulated set of PWM switching frequencies including the at least one PWM switching frequency modulated according to the reduced perturbation.

15. The method of claim 12, further comprising:
   measuring the sound in the cabin via an on-board microphone after adjusting the PWM parameter with the perturbation;
   calculating a noise quality metric for the sound;
   determining that the sound indicates the noise improvement if the noise quality metric is reduced relative to a noise quality metric calculated for sound measured before the perturbation; and
   determining that the sound does not indicate the noise improvement if the noise quality metric is not reduced relative to the noise quality metric calculated for the sound measured before the perturbation.

16. A system for a vehicle, comprising:
   a plurality of drive wheels;

an electric motor configured to deliver torque to the plurality of drive wheels;

a battery configured to provide power to the electric motor;

a switching system comprising electronic switches that selectively open and close responsive to pulse width modulated (PWM) signals to transfer the power from the battery to the electric motor; and a controller storing instructions that when executed cause the controller to:

modulate a PWM switching frequency with a perturbation; and control the switching system with the modulated PWM switching frequency responsive to sound measured in a cabin of the vehicle indicating a noise improvement responsive to the perturbation.

17. The system of claim 16, further comprising an on-board microphone positioned in the cabin and configured for recording vocal commands of vehicle occupants, the controller further storing instructions that when executed cause the controller to:

measure the sound in the cabin of the vehicle with the on-board microphone after modulating the PWM switching frequency with the perturbation;

calculate a noise quality metric for the measured sound; and determine the measured sound indicates the noise improvement when the noise quality metric is reduced relative to a noise quality metric calculated for sound measured before the perturbation.

18. The system of claim 16, wherein the controller further stores instructions that when executed cause the controller to:

revert the modulated PWM switching frequency to the PWM switching frequency; and control the switching system with the PWM switching frequency responsive to the sound measured in the cabin of the vehicle not indicating the noise improvement responsive to the perturbation.

19. The system of claim 16, wherein, to modulate the PWM switching frequency with the perturbation, the controller further stores instructions that when executed cause the controller to:

increase the PWM switching frequency according to the perturbation; and control the switching system with the increased PWM switching frequency responsive to sound measured in the cabin of the vehicle indicating a noise improvement responsive to the increased PWM switching frequency.

20. The system of claim 16, wherein, responsive to the sound measured in the cabin of the vehicle not indicating the noise improvement responsive to the increased PWM switching frequency, the controller further stores instructions that when executed cause the controller to:

revert the increased PWM switching frequency to the PWM switching frequency;

decrease the PWM switching frequency according to the perturbation; and control the switching system with the decreased PWM switching frequency responsive to sound measured in the cabin of the vehicle indicating a noise improvement responsive to the decreased PWM switching frequency.

* * * * *